(12) United States Patent
Mohri

(10) Patent No.: US 10,302,901 B2
(45) Date of Patent: May 28, 2019

(54) IMAGING APPARATUS AND FOCUS ADJUSTMENT METHOD

(71) Applicant: Olympus Corporation, Hachioji-shi, Tokyo (JP)

(72) Inventor: Koh Mohri, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/793,944

(22) Filed: Oct. 25, 2017

(65) Prior Publication Data

US 2018/0120534 A1 May 3, 2018

(30) Foreign Application Priority Data

Oct. 28, 2016 (JP) .................................. 2016-211774

(51) Int. Cl.

| | |
|---|---|
| *G02B 7/36* | (2006.01) |
| *G03B 13/36* | (2006.01) |
| *H04N 5/232* | (2006.01) |
| *G02B 7/28* | (2006.01) |
| *G03B 13/06* | (2006.01) |
| *G03B 13/16* | (2006.01) |

(52) U.S. Cl.
CPC ............... *G02B 7/282* (2013.01); *G02B 7/36* (2013.01); *G03B 13/06* (2013.01); *G03B 13/16* (2013.01); *G03B 13/36* (2013.01); *H04N 5/23212* (2013.01)

(58) Field of Classification Search
CPC .......... G03B 7/36; G03B 7/282; G03B 13/16; G03B 13/36; H04N 5/23212
See application file for complete search history.

(56) References Cited

U.S. PATENT DOCUMENTS

| | | | | |
|---|---|---|---|---|
| 9,172,863 | B2* | 10/2015 | Ohbuchi | ............ H04N 5/23212 |
| 2004/0109081 | A1* | 6/2004 | Sumi | .................. H04N 5/23212 |
| | | | | 348/345 |
| 2004/0196401 | A1* | 10/2004 | Kikuchi | ............ H04N 5/23212 |
| | | | | 348/345 |
| 2013/0271646 | A1* | 10/2013 | Hamano | ................ G03B 13/36 |
| | | | | 348/350 |
| 2016/0366329 | A1* | 12/2016 | Sasaki | ................ H04N 5/23212 |

FOREIGN PATENT DOCUMENTS

| | | |
|---|---|---|
| JP | 2005-345695 | 12/2005 |
| JP | 2007-171807 | 7/2007 |
| JP | 2015-184614 | 10/2015 |

\* cited by examiner

*Primary Examiner* — Clayton E. LaBalle
*Assistant Examiner* — Linda B Smith
(74) *Attorney, Agent, or Firm* — John C. Pokotylo; Pokotylo Patent Services

(57) ABSTRACT

In a focus adjustment method for an imaging apparatus, that, in order to focus on a single or a plurality of point light sources, acquires plurality of image data while moving a focus lens in an optical axis direction and carries out focus adjustment based on the image data, brightness values of pixels within a given evaluation region are detected based on the image data, high brightness evaluation values are calculated based on the brightness values, symmetry of the high brightness evaluation values are calculated for movement of the focus lens, and focus adjustment is carried out based on an extreme value calculated based on the symmetry.

19 Claims, 15 Drawing Sheets

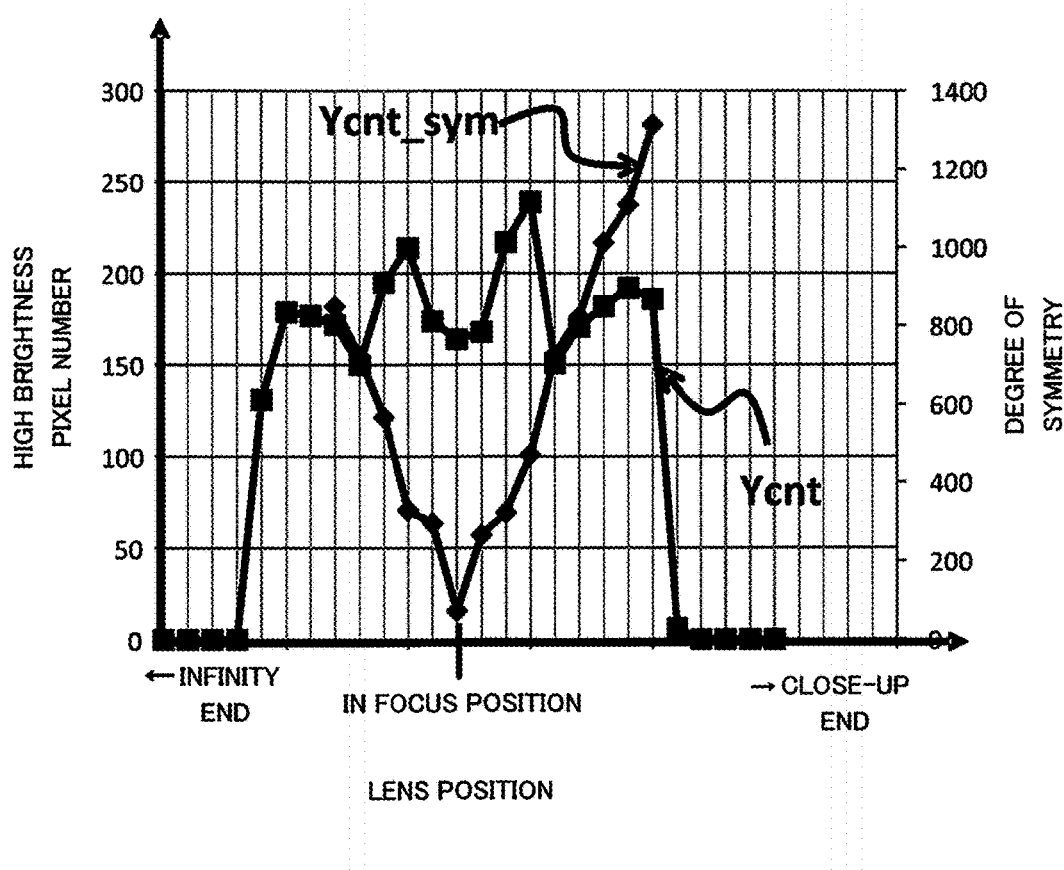

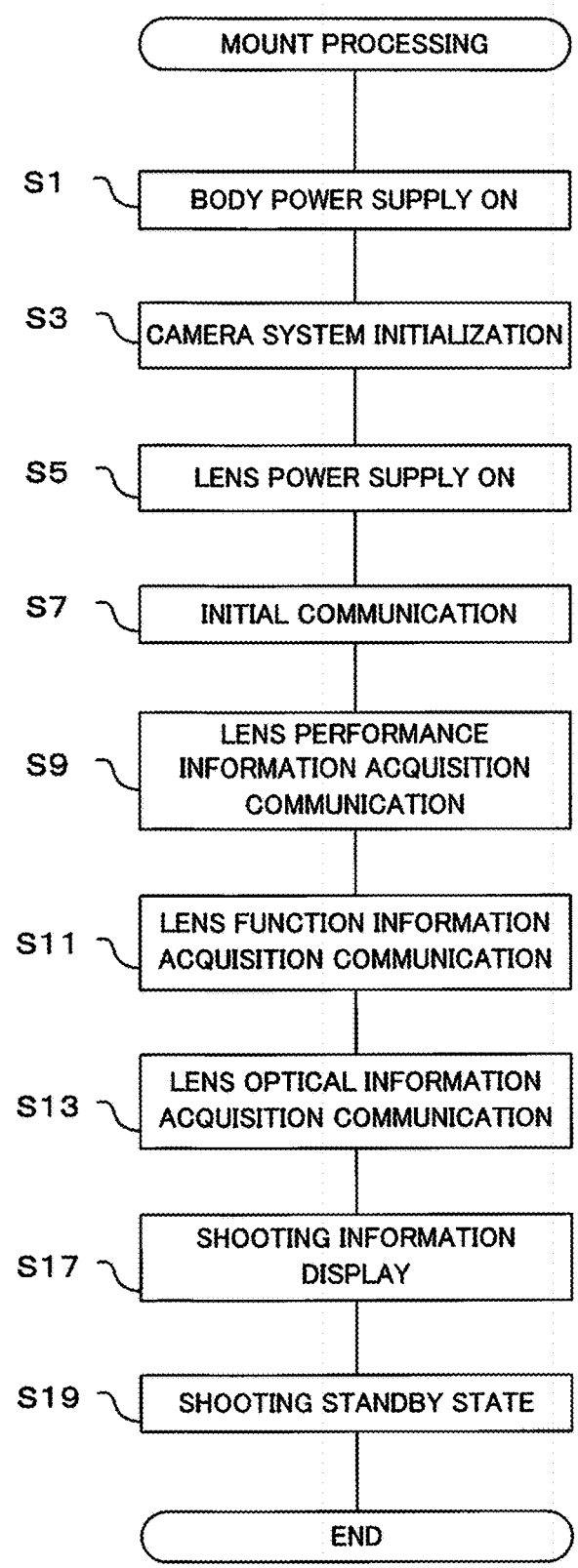

IMAGING APPARATUS AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2016-211774 filed on Oct. 28, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and focus adjustment method that can focus on a subject such as a point light source that is at infinity, such as a starry sky.

2. Description of the Related Art

There have conventionally been various proposals for a focus detection device for focusing on stars. For example, an automatic exposure adjustment device that detects and tracks a specified star from within an astronomical image of a shooting region and calculates in focus position from size and variation in brightness of the specified star is disclosed in Japanese patent laid-open No. 2015-184614 (hereafter referred to as "patent publication 1"). Also, a focus detection device that divides a shooting region into a plurality of small regions and calculates in focus position by selecting or excluding regions that will be used in focus processing using variation in contrast of stars within the respective region, is disclosed in Japanese patent No. 4692273 (hereafter referred to as "patent publication 2"). Further, Japanese patent No. 4595390 (hereafter referred to as "patent publication 3") proposes a camera in which a saturated state is determined from variation in sum value of an overall evaluation region of an image, and data used in calculation processing is selected using determination content.

In this way, focusing devices have been proposed that are suitable for shooting heavenly bodies such as stars, but there are the following problems to be resolved.

(1) High Brightness Evaluation Values that are Saturated Close to in Focus.

Shooting (AF scan shooting) is carried out while performing AF scanning (auto focus scanning) in order to detect in focus position, but setting of appropriate exposure conditions before AF scanning is difficult, and in a case where a focused point is approached during the course of scan shooting a brightness value becomes saturated and it is not possible to accurately detect focused point position. Specifically, whether or not a brightness signal is saturated in the vicinity of an in focus position can not be known unless AF scan is carried out, and for this reason, in the case where brightness value is saturated in the vanity of a focused point, it is not possible to calculate interpolation positions using 3-point interpolation etc.

(2) Effect of Camera Shake and Flickering.

Maximum brightness value among evaluation values that have been calculated from high brightness pixel data (high brightness evaluation values) is easily affected by flicker, and there are situations where errors arise in the case of calculating focused point from data in the vicinity of a peak of evaluation value characteristic value for a focus lens position using interpolation processing. Also, in a case of detection using a number of high brightness pixels among high brightness evaluation values, since an sum value of pixels of a plurality of heavenly bodies within an evaluation area is calculated, the effect of flicker is reduced. However, evaluation value fluctuates due to the effect of image blur due to camera shake, and errors sometimes arise in focused point calculation. Accordingly, due to the effects of camera shake and star flicker the characteristics of the high brightness evaluation values fluctuate, and errors arise in calculation of in focus position.

(3) Complex Focus Lens Position Characteristic Curve

If not only a single star within an evaluation region, but a bright star and a plurality of dim stars that are difficult to see with the naked eye are photographed, a lens position characteristic such as number of high brightness pixels is monotonic and not a characteristic having an extreme value, but becomes a complex characteristic. Specifically, in a taken scene in which a plurality of stars are observed, a high brightness evaluation value lens position characteristic has a complex curve because characteristic curves of respective stars are combined, which makes detection of in focus position difficult.

SUMMARY OF THE INVENTION

An object of the present invention is to provide an imaging apparatus and focus adjustment method that can suitably perform focusing regardless of whether or not a high brightness evaluation value is saturated, and even in a taken scene in which there are a plurality of stars.

An imaging apparatus of a first aspect of the present invention comprises a focus lens drive circuit that causes a focus lens to move in an optical axis direction, an image sensor that acquires a plurality of image data while causing the focus lens to move in the drive direction, and a processor that detects brightness values of pixels within a given evaluation region based on the image data, calculates high brightness evaluation values based on the brightness values, calculates symmetry of the high brightness evaluation values for movement of the focus lens, and carries out focus adjustment based on an extreme value calculated based on the symmetry.

A focus adjustment method of a second aspect of the present invention is a focus adjustment method for an imaging apparatus that, in order to focus on one or a plurality of point light sources, acquires a plurality of image data while moving a focus lens in an optical axis direction, and carries out focus adjustment based on the image data, and comprises detecting brightness values of pixels within a given evaluation region based on the image data, calculating high brightness evaluation values based on the brightness values, calculating symmetry of the high brightness evaluation values for movement of the focus lens, and carrying out focus adjustment based on an extreme value calculated based on the symmetry.

A non-transitory computer-readable medium of a third aspect of the present invention, storing a processor executable code, which when executed by at least one processor performs a focus adjustment method, the processor being provided within an imaging apparatus that in order to focus on a single or a plurality of point light sources, acquires a plurality of image data while moving a focus lens in an optical axis direction, and carries out focus adjustment based on the image data, the focus adjustment method comprising: detecting brightness values of pixels within a given evaluation region based on the image data, calculating high brightness evaluation values based on the brightness values, calculating symmetry of the high brightness evaluation values for movement of the focus lens, and carrying out focus adjustment based on an extreme value calculated based on the symmetry.

BRIEF DESCRIPTION OF THE DRAWINGS

FIG. 11 is a graph showing high brightness evaluation values and symmetry evaluation values, in the camera of one embodiment of the present invention.

FIG. 12 is a flowchart showing operation of mount processing of the camera of one embodiment of the present invention.

DETAILED DESCRIPTION OF THE PREFERRED EMBODIMENTS

An example where a digital camera (hereafter simply called "camera") is adopted as an imaging apparatus, as one embodiment of the present invention, will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display section if playback mode is selected.

Figure 16:
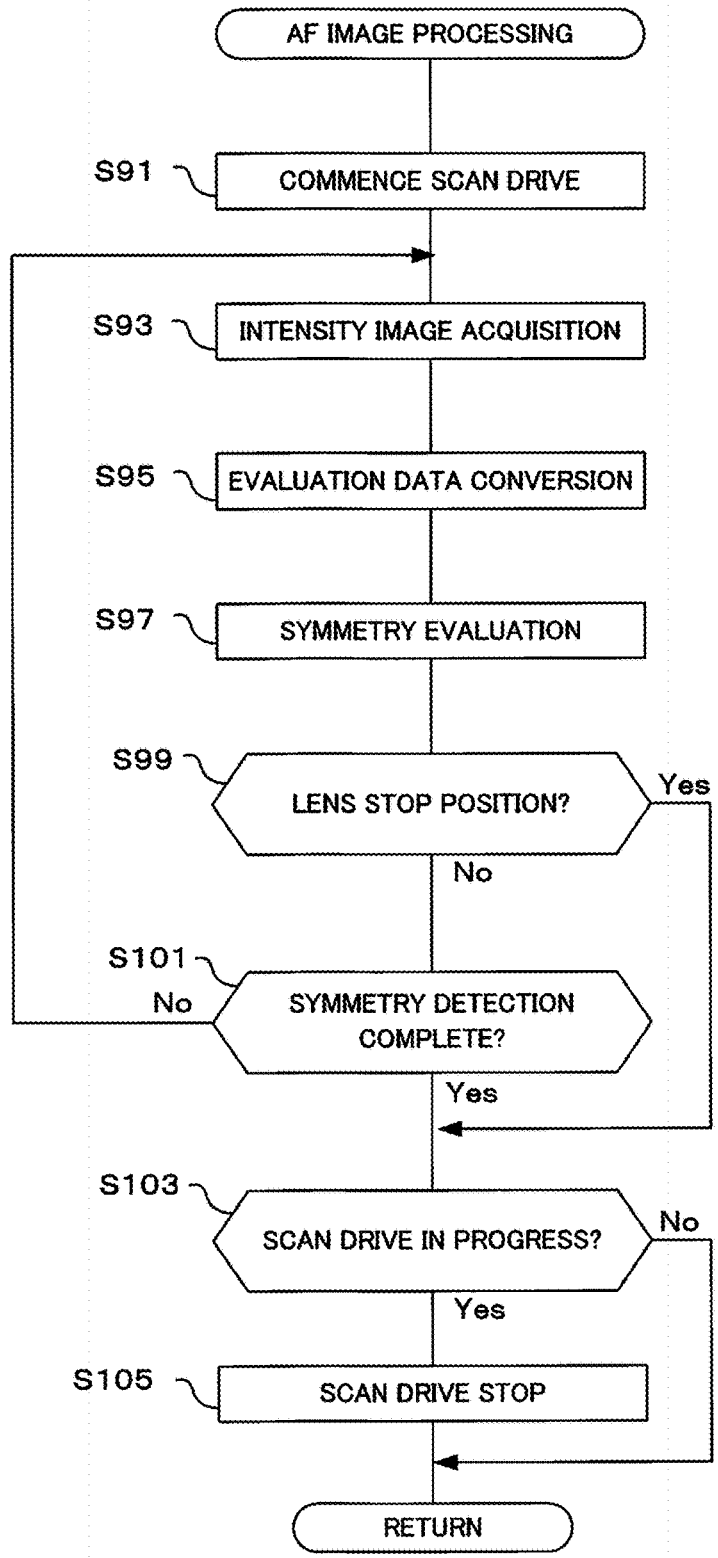
FIG. 16 is a flowchart showing AF image processing of the camera of one embodiment of the present invention.

Also, with this embodiment, in order to focus on one or a plurality of point light sources, a plurality of image data are acquired while moving a focus lens in an optical axis direction, and focus adjustment is carried out based on this image data (refer, for example, to S91 and S93 in FIG. 16). Brightness values of pixels within a given evaluation region are detected on the basis of image data (refer, to S93 in FIG. 16), high brightness evaluation values are calculated based on brightness values, symmetry of the high brightness evaluation values is calculated for movement of the focus lens (refer, for example, to S97 in FIG. 16), and this focus adjustment is carried out based on an extreme value calculated based on the symmetry (refer, for example, to S113 and S115 in FIG. 17).

Figure 1:
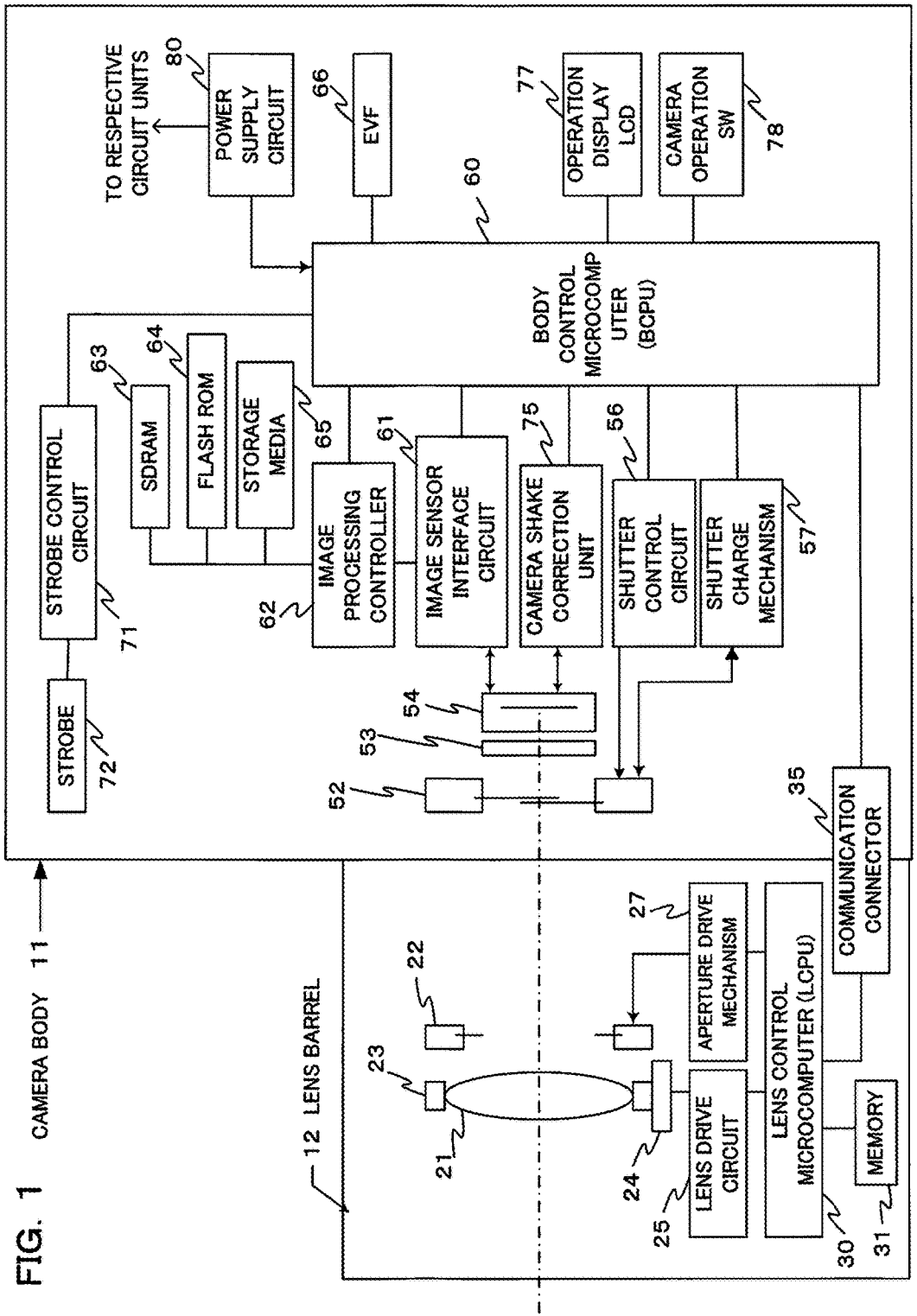
FIG. 1 is a block diagram mainly showing the electrical structure of a camera of one embodiment of the present invention.

FIG. 1 is a block diagram mainly showing the electrical structure of the camera of this embodiment. This camera is constructed with a camera body 11 and a lens barrel 12 being separate, and the lens barrel 12 is detachable from the camera body 1. It should be noted that the camera body 11 and the lens barrel 12 may also be formed integrally.

A photographing lens 21 for focus adjustment and focal distance adjustment, and an aperture 22 for adjusting opening diameter, are arranged within the lens barrel 12. The photographing lens 21 is held in a lens frame 23, with the lens frame 23 being driven in an optical axis direction by a lens drive mechanism 24 and a lens drive circuit 25, while the aperture 22 is driven by an aperture drive mechanism 27. The lens drive circuit 25 functions as a focus lens drive circuit that causes a focus lens to move in an optical axis direction. The lens barrel 12 functions as a lens section including a photographing lens.

The lens drive circuit 25 and the aperture drive mechanism 27 are connected to a lens control computer (hereafter referred to as "LCPU") 30, and drive control is performed using the LCPU 30. The LCPU 30 has a CPU (Central processing unit) and peripheral circuits, not shown, such as a lens drive pulse generating section, and controls each section within the lens barrel 12 in response to control instructions from the camera body 11 in accordance with a program that has been stored in a memory 31.

The LCPU 30 is connected to the memory 31. This memory 31 is a non-volatile memory that is capable of being electrically rewritten, such as flash ROM. As well as programs for the LCPU 30 described previously, the memory 31 stores various characteristics such as optical characteristics of the photographing lens 21, characteristics of the aperture 22 etc., and also stores various adjustment values. As optical characteristics of the photographing lens 21, there is information relating to distortion of the photographing lens 21 etc. for every focal length. The LCPU 30 reads out and transmits these items of information from the camera body 11 as required.

The memory 31 functions as a storage section that stores distortion data of the photographing lens. This storage section stores a plurality of AF area arrangement information in accordance with distortion data corresponding to a plurality of optical states of the photographing lens (for example, for every focal length and every focus lens position).

The LCPU 30 is connected to a communication connector 35, and carries out communication with a body control microcomputer (hereafter referred to as "BCPU") within the camera body 11 by means of this communication connector 35. Also, the communication connector 35 has power feed terminals for supplying power from the camera body 11 to the lens barrel 12. The LCPU 30 and the BCPU 60 can be realized using a general ASIC (Application specific Integrated Circuit).

A shutter 52 for exposure time adjustment is provided in the camera body 11, on the optical axis of the photographing lens 21. With this embodiment, the shutter 52 is a focal plane shutter having a front curtain and a rear curtain. The shutter 52 is subjected to shutter charge by a shutter charge mechanism 57, and opening and closing control of the shutter 52 is carried out by a shutter control circuit 56.

An image sensor unit 54 is arranged behind the shutter 52, on the optical axis of the photographing lens 21, and a subject image that has been formed by the photographing lens 21 is photo electrically converted to a pixel signal. It should be noted that as an image sensor within the image sensor unit 54 it is possible to use a two dimensional image sensor such as a CCD (charge Coupled Device) image sensor or a CMOS (Complementary Metal Oxide Semiconductor) image sensor. The image sensor within the image sensor unit 54 functions as an image sensor that acquires a plurality of image data while moving the focus lens in the drive direction.

An optical low pass filter (OLPF) 53, which is an optical filter for removing infrared light components and high-frequency components from subject light flux, is arranged between the previously described shutter 52 and image sensor 54.

The image sensor unit 54 is moved in a direction that counteracts camera shake, within a plane that is perpendicular to the optical axis of the photographing lens 21, by a camera shake compensation unit 75. Specifically, if the camera body 11 moves due to camera shake by the photographer, fluctuation amount and direction of this movement are detected by a shake detection section such as a Gyro Sensor (not illustrated), and the camera shake compensation unit 75 causes the image sensor unit 54 to move so as to counteract the movement that has been detected, in accordance with control from the BCPU 60.

The image sensor unit 54 is connected to an image sensor interface circuit 61. The image sensor interface circuit 61 reads out a pixel signal from the image sensor within the image sensor unit 54 in accordance with control commands from the BCPU 60, and after pre-processing, such as amplification processing and A/D conversion processing, has been applied outputs to an image processing controller 62.

The image processing controller 62 carries out various image processing such as digital amplification of digital image data (digital gain adjustment processing), color correction, gamma (γ) correction, contrast correction, and image generation for live view display etc. Also, image data is compressed using a compression system such as JPEG or TIFF, and compressed image data is expanded. It should be noted that image compression is not limited to JPEG or TIFF, and other compression formats may be used.

An SDRAM (Synchronous Dynamic Random Access Memory) 63, flash ROM 64, and storage media 65 are connected to the image processing controller 62. These components can be realized by standard memory ICs (Integrated Circuits) available on the market.

The SDRAM 63 is an electrically rewritable volatile memory, and carries out temporary writing and reading out of image data that has been read out from the image sensor unit 54. The flash ROM 64 is an electrically rewritable nonvolatile memory, and perform storage and readout of programs for the BCPU 60, and various adjustment values etc. The flash ROM 64 stores lens characteristics such as distortion data from the memory 31.

For the storage media 65, any storage medium that is capable of being rewritten, such as CompactFlash (registered trademark), SD memory card (registered trademark), or memory stick (registered trademark) can be loaded, and is put into and taken out of the camera body 11. Besides this, it is also possible to have a configuration where it is possible to connect to a hard disc via a communication connection point.

A strobe 72 boosts a power supply voltage from a power supply circuit 80 and comprises a capacitor that is charged with the boosted high-voltage, xenon flash tube for flash light emission, and a trigger circuit etc., and is used as a lighting device for low brightness subjects. A strobe control circuit 71 carries out control of charging and triggering etc. of the strobe 72 in accordance with control commands from the BCPU 60.

An EVF (Electronic Viewfinder) 66 enables the photographer to observe an image displayed on a display panel built in to the camera body 11 by means of an eyepiece. Live view display and playback of stored images etc. is carried out on the EVF 66. An LCD (Liquid Crystal Display) for operational display is provided on the exterior of the camera body 11, and carries out display of operating states of the camera, and live view display and playback display of stored images.

The camera operation switch (SW) 78 is a switch linked to operation of operation members such as a power supply button, release button, menu button, OK button etc. A 1R switch (1RSW) that detects a half press operation of the release button, and a 2R switch (2RSW) that detects a full press operation of the release button are provided in the release button.

A power supply circuit 80 has a power supply battery fitted to the camera body 11, and supplies a power supply voltage to each of the circuit units within the camera body 11 and the lens barrel 12.

A body control microcomputer (BPCU) 60 has a CPU (Central Processing Unit) and peripheral circuits etc. for the CPU. The CPU executes processing for the entire camera by controlling each section within the camera body 11 and, by means of the LCPU 30, each section within the lens barrel 12, in accordance with programs that have been stored in the flash ROM 64.

The BCPU 60 detects brightness values of pixels within an AV evaluation region AFVA, which will be described later, based on image data input by means of the image sensor interface 61 (for example, the luminance image 103 in FIG. 5, and S93 in FIG. 16). The BCPU 60 functions as a brightness value detection section that detects brightness values of pixels within a given evaluation region based on image data. It should be noted that a method of converting from input image data to luminance image data will be described later.

Figure 5:
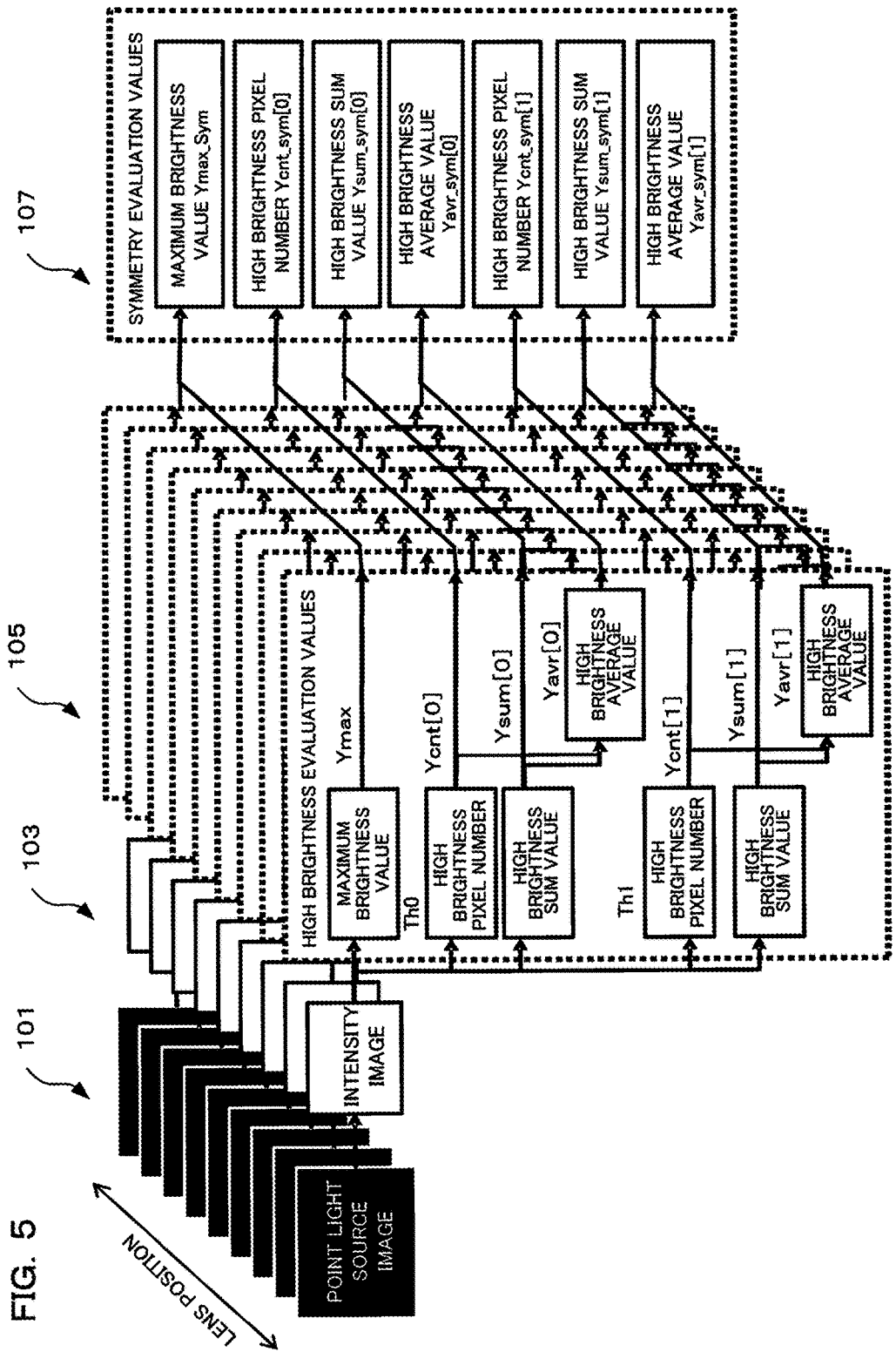
FIG. 5 is a drawing for describing symmetry conversion processing, in the camera of one embodiment of the present invention.

The BCPU 60 moves the focus lens, and calculates high brightness evaluation values based on brightness values that have been acquired at respective lens positions (refer, for example, to the high brightness evaluation values 105 in FIG. 5, and S97 in FIG. 16). The BCPU 60 functions as an evaluation calculation section that calculates high brightness evaluation values based on brightness values.

The BCPU 60 applies symmetry processing to high brightness evaluation values that have been acquired at a plurality of focus lens positions and calculates symmetry evaluation values (refer, for example, to the symmetry evaluation values 107 in FIG. 5 and S97 in FIG. 16). The BCPU 60 functions as a symmetry calculation section that calculates symmetry of high brightness evaluation values for movement of the focus lens.

Figure 4A:
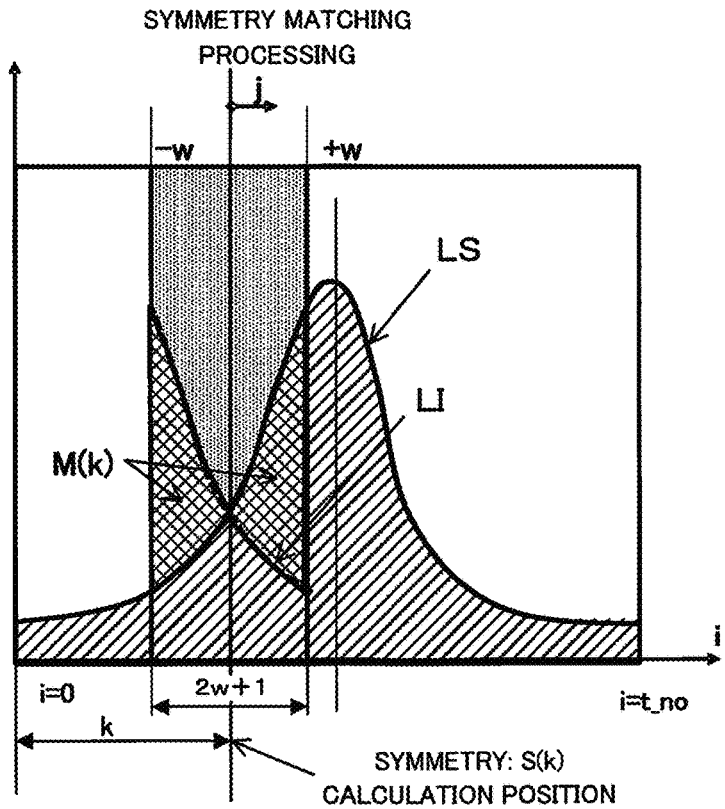
FIG. 4A and FIG. 4B are graphs for describing symmetry matching processing, in the camera of one embodiment of the present invention.
Figure 4B:
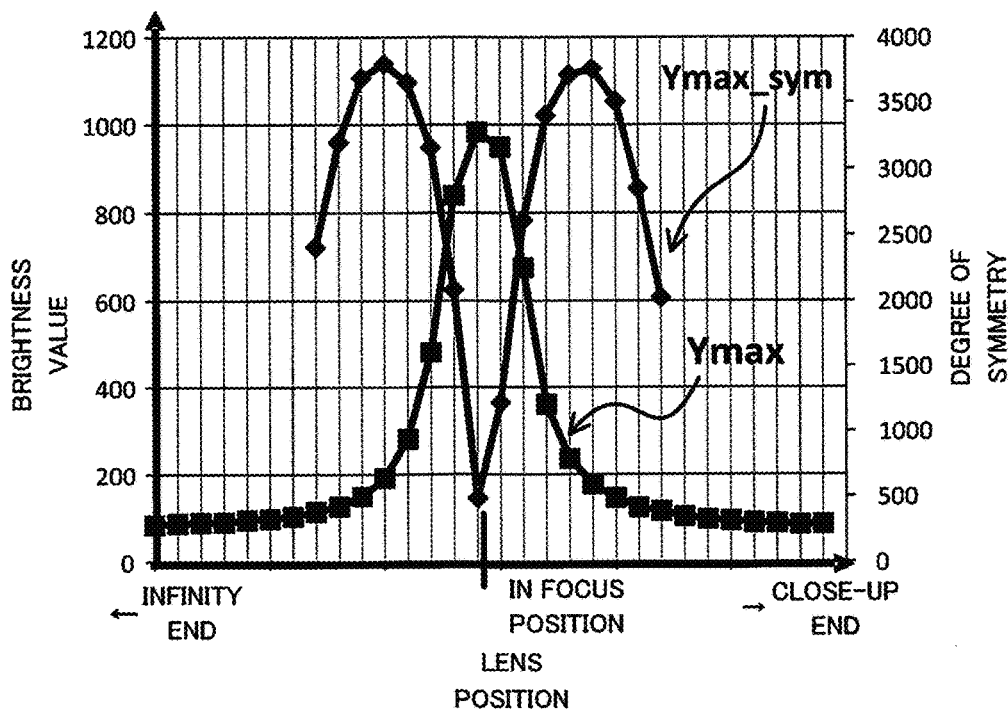
Figure 17:
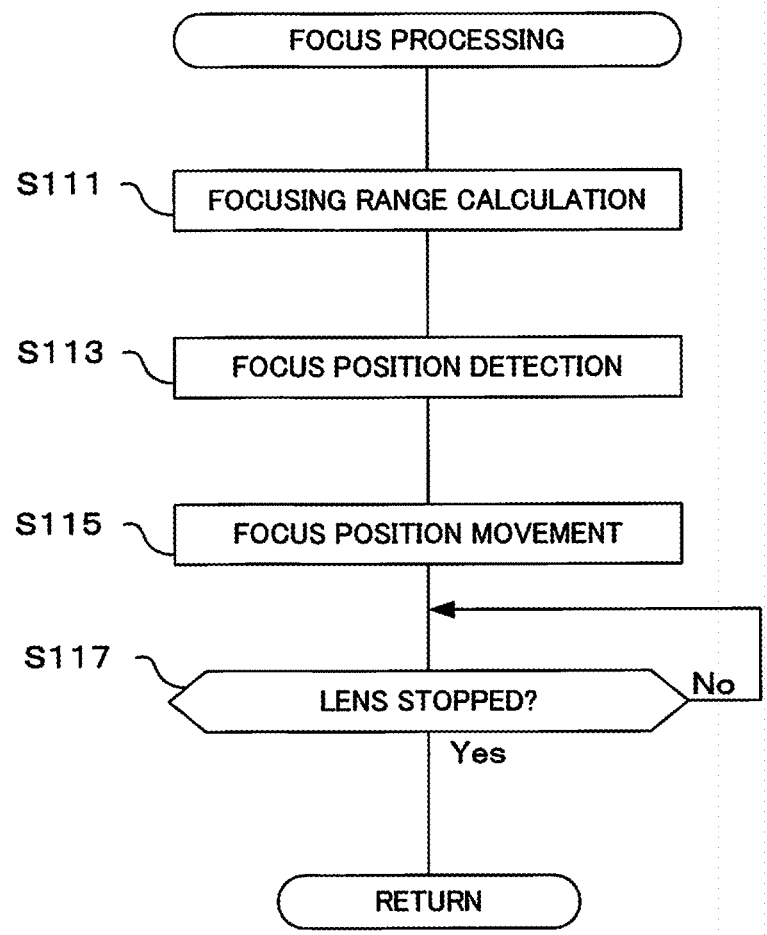
FIG. 17 is a flowchart showing AF processing of the camera of one embodiment of the present invention.

The BCPU 60 obtains in focus position based on position of an extreme value of the symmetry evaluation values, and moves the focus lens to this in focus position (refer, for example, to extreme value Ymax_sym in FIG. 4B and S113 and S115 in FIG. 17). The BCPU 60 functions as a control section for carrying out focus adjustment based on an extreme value calculated based on symmetry.

Figure 3:
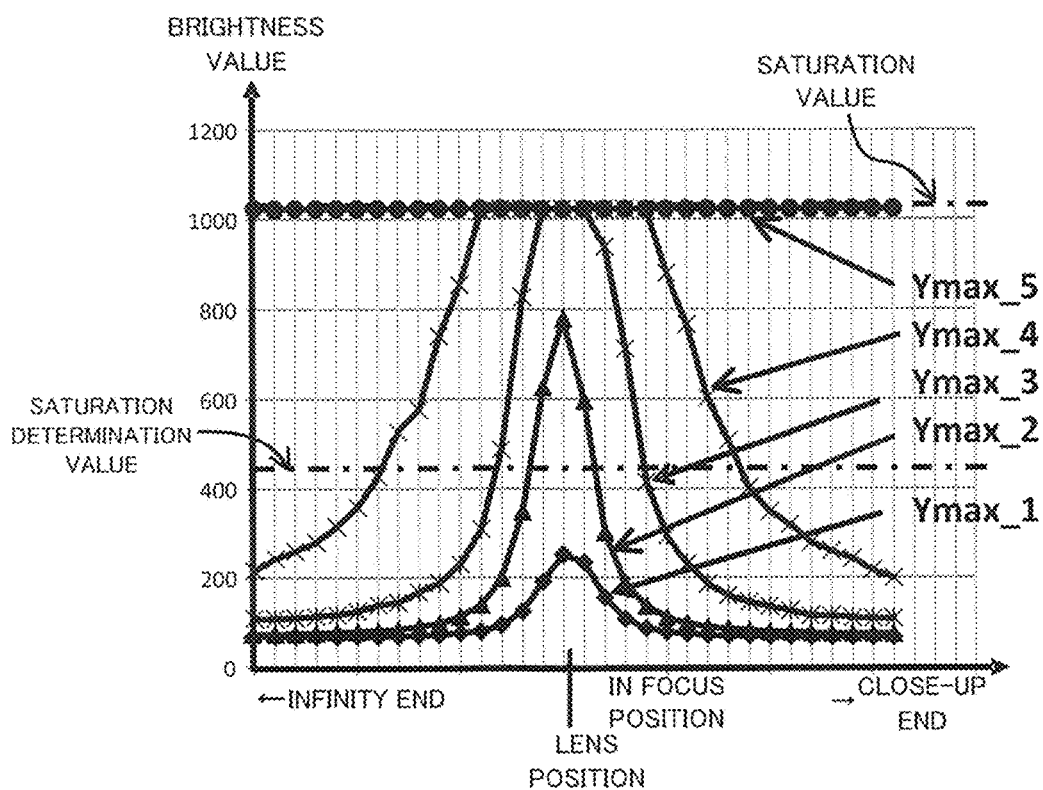
FIG. 3 is a graph showing a relationship between lens position and maximum brightness value, in an AF evaluation region, in the camera of one embodiment of the present invention.
Figure 15:
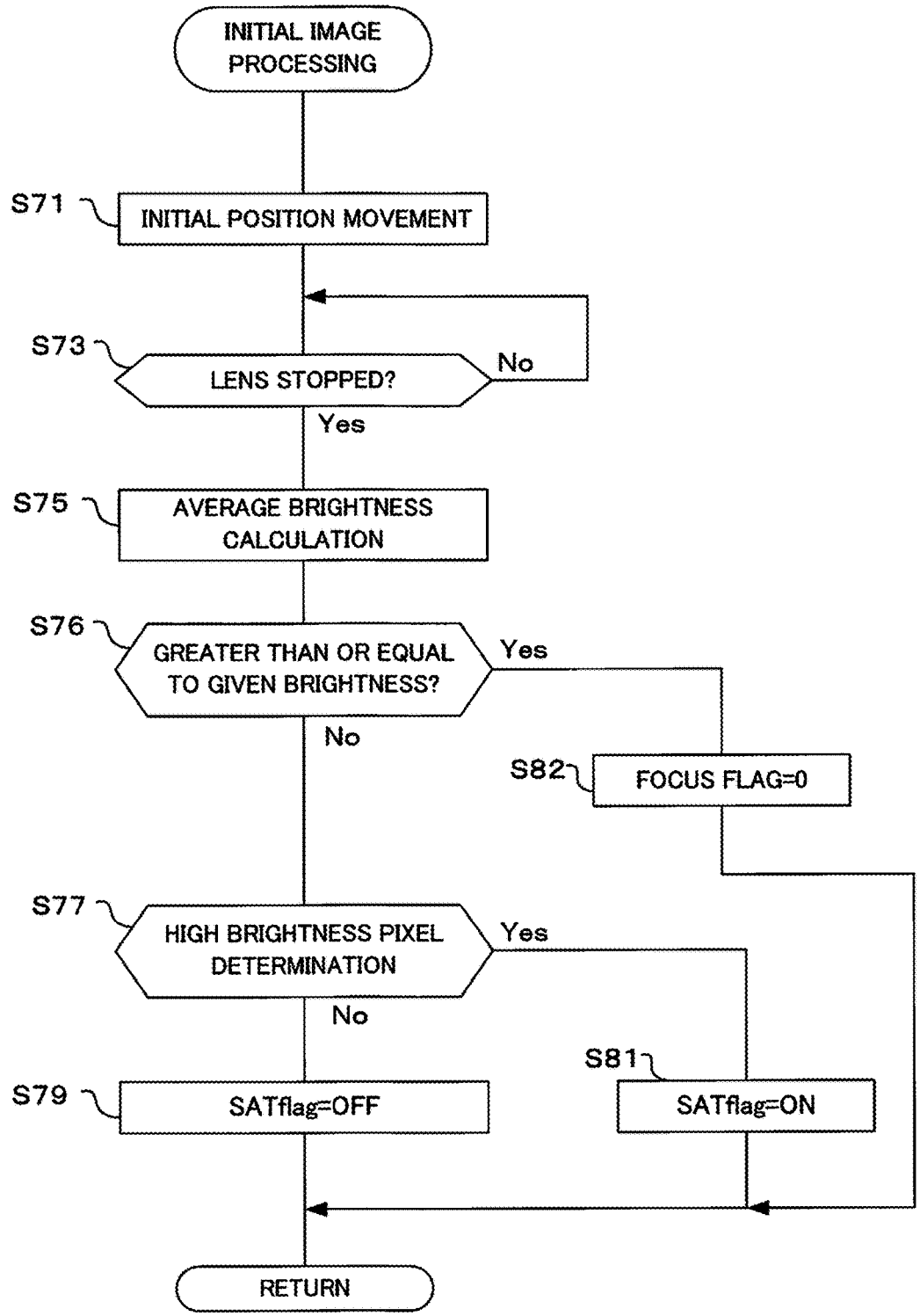
FIG. 15 is a flowchart showing initial image processing of the camera of one embodiment of the present invention.

The BCPU 60 also carries out prediction as to whether or not a saturation state has been reached (refer, for example, to the saturation judgment value in FIG. 3, determination values Th0 and Th1 (Th0<Th1) in FIG. 5, and S77 in FIG. 15 etc.) based on brightness values after movement to an initial position (refer to S71 and S73 in FIG. 15). The BCPU 60 functions as a saturation state terminations that determines saturation state based on brightness values. In this case, the symmetry calculation section described above, in the event that a non-saturated state has been determined, sets a high brightness evaluation value to a brightness value representing maximum brightness within the evaluation region (maximum brightness value), and in the event that a saturated state has been determined sets a high brightness evaluation value to a number of pixels that exceed a given brightness value within the evaluation region (high brightness pixel number) (refer, for example, to S77-S81 in FIG. 15 and S95 and S97 in FIG. 16, which will be described later). In this way, it is possible to reduce calculation load by only processing the minimum required data.

The saturation state determination section described above may perform determination by comparing a brightness value representing maximum brightness within the evaluation region with a given value, or may perform determination based on a number of pixels that exceed a given brightness value within the evaluation region (refer, for example, to S77 in FIG. 15).

The BCPU 60 functions as a processor that detects brightness values of pixels within a given evaluation area based on image data, calculates high brightness evaluation values based on brightness values, calculates symmetry of high brightness evaluation values for movement of the focus lens, and carries out focus adjustment based on an extreme value calculated based on symmetry. The BCPU 60 also functions as a processor that sets a movement range of a focus lens that acquires a plurality of image data based on a ratio of maximum value to minimum value of a plurality of high brightness evaluation values within an evaluation region, and/or based on a ratio of maximum value to minimum value of symmetry of high brightness evaluation values, and controls focus lens movement and image data acquisition based on the movement range that has been set. The BCPU 60 also functions as a processor that determines saturated state based on brightness values, and in the event that a result of determination of this saturated state is that a non-saturated state has been determined sets a high brightness evaluation value to a brightness value representing maximum brightness within the evaluation region, while in the event that a saturated state has been determined sets high brightness evaluation values to a number of pixels that exceed a given brightness value within the evaluation region.

In this embodiment, the above-described brightness value detection section, evaluation value calculation section, symmetry calculation section, control section, and saturation state determination section are realized in software by the BCPU 60. However, it is also possible for some or all of these functions to be realized by hardware circuits, and to have a hardware structure such as gate circuits that have been generated based on a programming language that is described using Verilog, and also to use a hardware structure that utilizes software such as a DSP (digital signal processor). Suitable combinations of these approaches may also be used.

A mode for taking in pixel data from the image sensor within the image sensor unit 54 of this embodiment will be described.

For point light sources that are at the infinity end, such as stars, in the case of carrying out focus detection, with this embodiment pixel data intake from the image sensor is carried out using all pixel intake mode. As pixel data intake mode there is thinning intake mode in which pixel data is taken in at random pixel positions. However, if the focus lens is moved brightness of stars becomes high near to a focus position, but with thinning intake mode where only pixel data at random pixel positions is taken in, stellar images may be missed near to the focus position. With this embodiment therefore, at the time of carrying out focusing in still images, all pixel intake mode is executed.

Also, the image sensor has a Bayer array, for example, as a color filter array, having R pixels, Gb·Gr pixels, and B pixels, and generates RAW (RGbGrB) image data based on output from respective pixels. Image data for focus detection is acquired by converting from RAW image data to luminance image data. As a method of converting to a luminance image, for example, calculation may be performed using 4 pixel arithmetic mean image data (Y=(R+Gb+Gr+B)) etc. Also, if there is 4 pixel arithmetic mean image data that has been processed from all pixel intake mode, it may be made brightness information by thinning in the horizontal and the vertical directions by ½.

Also, with this embodiment exposure time for the image sensor is set to ⅟30th of a second (frame rate 30 fps), but this is not limiting and may also be different exposure times such as ⅟60th of a second, ⅟120th of a second etc. It should be noted that exposure conditions are made constant during AF image acquisition (S93 in FIG. 16).

Next, high brightness evaluation values of this embodiment, and detection of in focus position using symmetry evaluation values acquired by applying symmetry processing to these high brightness evaluation values, will be described using FIG. 2 to FIG. 11. This embodiment is suitable for focus detection when carrying out focusing on a point light source that is at infinity. Details of the high brightness evaluation values will be described later using FIG. 3, FIG. 5 etc., while symmetry evaluation values will be described later using FIG. 4A, FIG. 4B, FIG. 5 etc.

Figure 2:
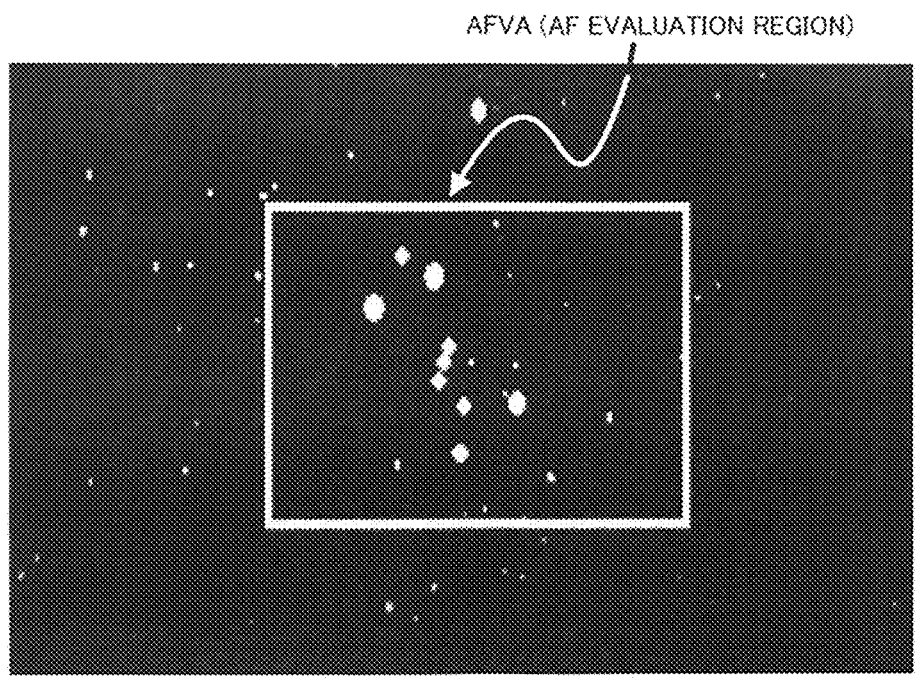
FIG. 2 is a drawing showing an AF evaluation region for calculating high brightness evaluation values, in the camera of one embodiment of the present invention.

FIG. 2 shows an image of stars etc. that has been acquired by an imaging apparatus such as a camera. High brightness evaluation values are calculated based on image data of an AV evaluation region AFVA. The size and position of this region may be set manually by the photographer, and may be set automatically in accordance with default values.

FIG. 3 is a graph showing high brightness evaluation values based on maximum brightness value within the AV evaluation region AFVA. In FIG. 3, the horizontal axis represents position of the focus lens within the photographing lens 21, and the vertical axis represents brightness value. This brightness value represents maximum brightness value of the AV evaluation region AFVA. Characteristic change of the high brightness evaluation values changes in accordance with (a) type (magnitude, size of point light source etc.) and number of stars, (b) exposure conditions (shutter speed, aperture value, sensitivity), (c) focal length of lens, (d) shooting conditions (weather conditions, time), and (e) evaluation region etc. Brightness rank of point light sources within the AV evaluation region AFVA is generally constant regardless of focus lens position. The graph shown in FIG. 3 represents a brightness characteristic for every star of different brightness, in a case where conditions (b)-(d) above are made constant.

First, in FIG. 3, the line represented by Ymax_1 plots change in maximum brightness value, in the AV evaluation region AFVA, based on image data from the image sensor within the image sensor unit 54, while changing position of the focus lens. Specifically, there are many stars within the AV evaluation region AFVA, as shown in FIG. 2, and brightness values of extremely high brightness stars within the AV evaluation region AFVA are detected, and the line Ymax_1 is obtained by plotting data for every position of the focus lens. A characteristic for change in maximum brightness in accordance with focus lens position for a single star has a peak in maximum brightness value close to in focus position for the focus lens, and maximum brightness value is reduced in accordance with distance from the in focus position.

Also, in FIG. 3, the line represented by Ymax_2 plots change in maximum brightness value, in another AV evaluation region AFVA, while changing position of the focus lens. In this case, Ymax_2 is higher up than Ymax_1 because a star that is brighter than Ymax_1 is within the AV evaluation region AFVA. In FIG. 3, examples are shown that plot Ymax_3 and Ymax_4 in different AV evaluation regions AFVA, similarly to Ymax_1 and Ymax_2.

Ymax_5 shown in FIG. 3 is brightness values for the case where there is a bright star such as a first magnitude star, or the moon, within the AV evaluation region AFVA. In this case, since it is extremely bright the brightness values are saturated regardless of the focus lens position.

It should be noted that in the graph shown in FIG. 3, a saturation judgment value SJV is a judgment value for estimating whether or not a saturation state has been reached close to where the focus lens is at an in focus position. This judgment value is used, in detecting high brightness value peak while scanning the focus lens, when estimating whether or not a brightness value is saturated close to an in focus position, at a scan commencement position.

Next, symmetry matching processing (symmetry processing) will be described using FIG. 4A and FIG. 4B. In FIG. 4A, line LS is an image signal corresponding to focus lens position, and corresponds to Ymax_1-Ymax_4 in FIG. 3. This image signal is represented by G(i) if focus lens position is made i.

Also, in FIG. 4A line LI is an inversion signal generated by reversing a line LS, with focus lens position k that calculates degree of symmetry S(k) (also called symmetry evaluation value) as an axis of symmetry. If symmetry calculation position is made k, then for an image signal G for position k+1, this inversion signal LI is represented by G(k−j). Also, i is changed within a range of width ±w required to calculate symmetry S(k), that is, from −w to +w.

Here, as shown in FIG. 4A, if "i" is made a focus lens position where image data was acquired and a number of images that have been taken at each focus lens position i is made from 0 to t_no−1, a range of calculation position k for symmetry becomes from i=w to i=t_no−w−1. This is in order to restrict a range in which it is possible to change symmetry calculation position k to as narrow as width w required in calculating symmetry.

FIG. 4A shows symmetry calculation position i=k, and plots an inversion signal LI, which is a left right inversion of line LS for a range of ±w (window range is 2w+1), with i=k as an axis of symmetry. A region M(k) is a difference between line LS representing change in an image signal and line LI representing change in an inversion signal.

Processing to calculate symmetry S(k) based on an area of this difference (corresponding to region M(k)) can be represented by the following equations (1) to (3).

$$M(s) = \Sigma \{G(k+j) - G(k-j)\}^2 \quad (j=-w \text{ to } w) \qquad (1)$$

$$S(k) = \Sigma \text{ABS}\{G(k+j) - G(k-j)\} \quad (j=-w \text{ to } w) \qquad (2)$$

$$S(k) = \Sigma \text{ABS}\{G(k+j) - G(k-j)\} \quad (j=1 \text{ to } w) \qquad (3)$$

Equation (2) can suppress the size of data compared to the basic equation of equation (1), and equation (3) can further reduce calculation range. It should be noted that ABS means absolute value.

FIG. 4B shows values for a case where symmetry matching processing that was described in FIG. 4A (hereafter called symmetry processing) has been applied to the high brightness values ymax that were shown in FIG. 3. Specifically, if symmetry processing is applied to Ymax in FIG. 4B using equation (3) above, Ymax_sym is obtained. Ymax_sym can be calculated from a position that is separated from focus lens position by one side w of the window, which is an infinity side scan start position. Also, as shown in FIG. 4B, Ymax_sym becomes an extreme value (P value) at a position corresponding to where focus lens position is an in focus position. Accordingly, a position of an extreme value of a value resulting from applying symmetry processing to high brightness values Ymax (Ymax_sym) becomes an in focus position for the focus lens.

Next, lens drive operation will be described. With this embodiment, a control position (control infinity position) for controlling movement of the focus lens further to an infinity end than an optical infinity position is provided, and image data is acquired while moving the focus lens from this control infinity position to the close up end. Regarding movement of the focus lens and shooting format at this time, there are a lens scan drive operation and lens step drive operation, and lens drive operation is carried out using either method.

With a lens scan operation, the focus lens is moved to a scan drive start position, a target position is set, and drive is performed at a constant speed LDspeed. LDspeed at this time is set using equation (4) below).

$$LD\text{speed [mm/s]} = K\text{step} \cdot F\delta[\mu m] \cdot \text{FrameRate [fps]} \div 1000 \qquad (4)$$

Here, Fδ is focal depth, F represents aperture value, and δ represents blur diameter that can be tolerated (permissible circle of confusion). Also, Kstep is a coefficient for determining image plane movement amount per single frame. In the case of carrying out a lens scan drive operation, an imaging unit carries out continuous shooting of images at a constant frame rate FrameRate. With this embodiment FrameRate=30 fps has been adopted as the frame rate, but a frame rate other than this such as, for example, 60 fps, 120 fps etc. may also be used.

With a lens step drive operation, once the focus lens is moved by a constant amount it is stopped at that position, and an image is taken. After shooting, the focus lens is moved by a constant amount and an image is taken. Movement of the focus lens and shooting are carried out while repeatedly carrying out this operation. With this embodiment, there is a relationship of image plane movement amount for 1 step LDstep=Kstep·Fδ [μm]. The image plane movement amount LDstep is converted to a motor pulse amount, and the focus lens is driven. In this way, a step drive operation and shooting operation are alternately carried out and shooting is carried out within a measuring range.

Drive amount for the lens step drive operation is determined as described below. Specifically, if the measuring range is set to ±30Fδ [μm], a total number of lens steps N corresponding to the measuring range becomes N=60/Kstep [step]. If drive is performed with Kstep=2, then ±15[step] either side of the focus point becomes the number of drive steps.

If measuring range is made data ±30Fδ, processing window width (one side) w for detecting symmetry of high brightness evaluation values is set to about 6 to 9 Fδ (20-30%) in order to ensure focus precision of ±Fδ. In this case, w=N/5 to N/3 holds, and in the case of Kstep=1 N=60, and w is set as shown below.

w=12~20[step] (Kstep=1)

Also, in the case of Kstep=2 N=30, and w is set as shown below.

w=6~10[step] (Kstep=2)

Regarding movement range of the focus lens, a movement range setting section may be provided that sets movement range of the focus lens that acquires a plurality of image data based on a ratio of maximum value to minimum value of a plurality of high brightness evaluation values within the AV evaluation region AFVA, and/or based on a ratio of maximum value to minimum value of symmetry that has been calculated by the symmetry calculation section. The BCPU 60 may fulfill the function of a movement range setting section. For example, maximum value and minimum value of symmetry values are constantly stored and updated during symmetry processing. Detection may be completed if minimum value, which is an extreme value, is no longer updated and a current value starts to increase, and further if a current value exceeds a value obtained by multiplying a difference between maximum value and minimum value by a given ratio. The BCPU 60 fulfills the function of a control section that controls movement of the focus lens and acquisition of image data based on a movement range that has been set.

By providing this type of movement range setting section and carrying out movement of the focus lens and acquisition of image data within the movement range that has been set, it is possible to reduce scan time up to an unnecessary range, and it is possible to speed up control operation for focus adjustment.

Next, calculation of high brightness evaluation values and symmetry evaluation values will be described using FIG. 5. As has been described above, it is possible to acquire image data of a point light source image 101 according to focus lens position, by moving the focus lens and carrying out shooting. Image data of this point light source image 101 is converted to image data of a luminance image 103, and high brightness evaluation values 105 are calculated for every focus lens position based on this image data.

As high brightness evaluation values, with this embodiment seven types are calculated, namely, maximum brightness value Ymax, high brightness pixel number Ycnt[0], high brightness sum value Ysum[0], high brightness average value Yavr[0], high brightness pixel number Ycnt[1], high brightness sum value Ysum[1], and high brightness average value Yavr[1].

Maximum brightness value Ymax is brightness of the brightest point light source within the AV evaluation region AFVA, as was described using FIG. 3. Specifically, high brightness evaluation values are brightness values representing maximum brightness within the evaluation region. High brightness pixel number Ycnt[0] is a number of pixels that exceed a judgment value Th0 within the AV evaluation region AFVA. Specifically, high brightness evaluation values are a number of pixels that exceed a given brightness value within the evaluation region.

High brightness sum value Ysum[0] is an sum value of pixel values of each pixel, based on pixels that have exceeded the judgment value Th0, within the AV evaluation region AFVA. Specifically, high brightness evaluation values are sum values of brightness values of pixels that exceed a given brightness value within the evaluation region. High brightness average value Yavr[0] is a value resulting from dividing a high brightness sum value Ysum[0] by high brightness pixel number Ycnt[0]. Specifically, high brightness evaluation values of values resulting from dividing and sum value by a number of pixels that exceed the given brightness value.

Similarly, high brightness pixel number Ycnt[1], high brightness sum value Ysum[1], and high brightness average value Yavr[1] are values that have been calculated with the judgment value updated from Th0 to Th1. Th1 is set to a higher value than Th0. It should be noted that in the case of calculating high brightness evaluation values, position, shape, size etc. of the AV evaluation region AFVA may be appropriately corrected using lens characteristic information such as distortion data that has been acquired from the memory 31 within the lens barrel 12.

Regarding the symmetry evaluation values 107, processing can be carried out if high brightness evaluation values 105 for every focus lens position in the range of a window width (2w+1) are all calculated, and the symmetry evaluation values 107 can be calculated by applying symmetry matching processing that was described using FIG. 4A and FIG. 4B. As the symmetry evaluation values 107 there are the following seven types, namely, maximum brightness value Ymax_Sym, high brightness pixel number Ycnt_Sym[0], high brightness sum value Ysum_Sym[0], high brightness average value Yavr_Sym[0], high brightness pixel number Ycnt_Sym[1], high brightness sum value Ysum_Sym[1], and high brightness average value Yavr_Sym[1]. Maximum brightness value, as a symmetry evaluation value 107, is calculated as was described using FIG. 4A and FIG. 4B. Other symmetry evaluation values can also be similarly calculated based on any of previously described equations (1) to (3).

Figure 6A:
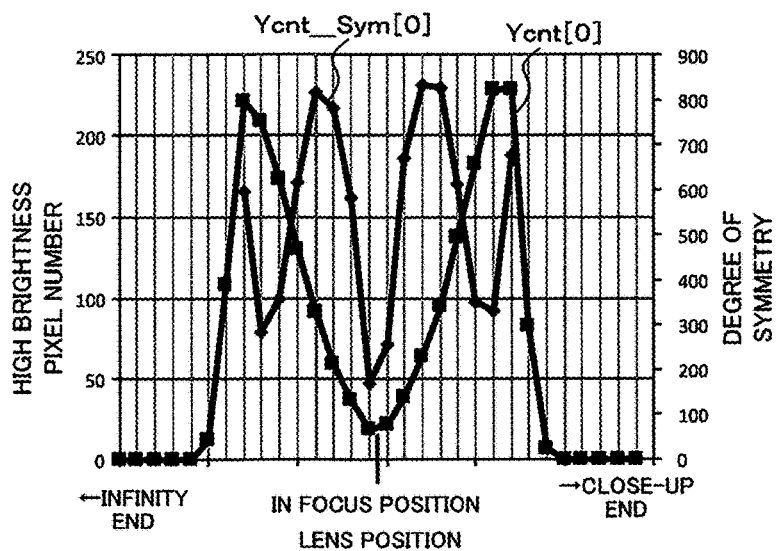
FIG. 6A to FIG. 6C are graphs showing high brightness evaluation values and symmetry evaluation values, in the camera of one embodiment of the present invention.
Figure 6B:
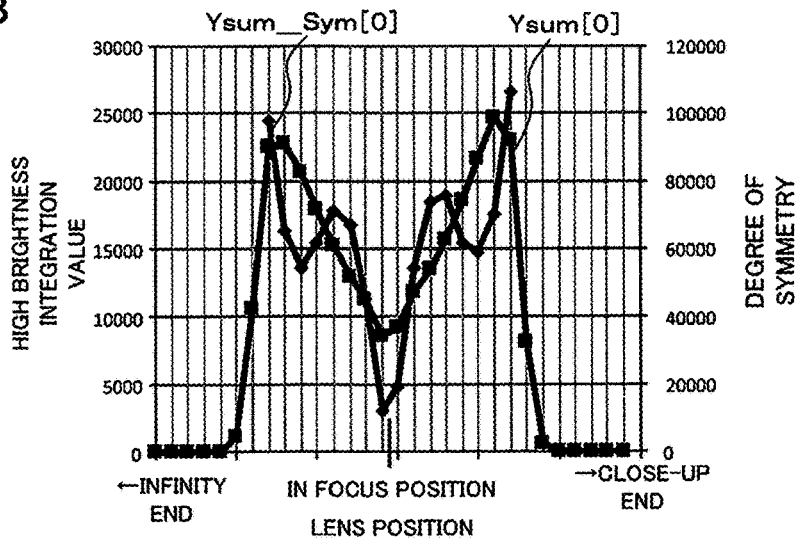
Figure 6C:
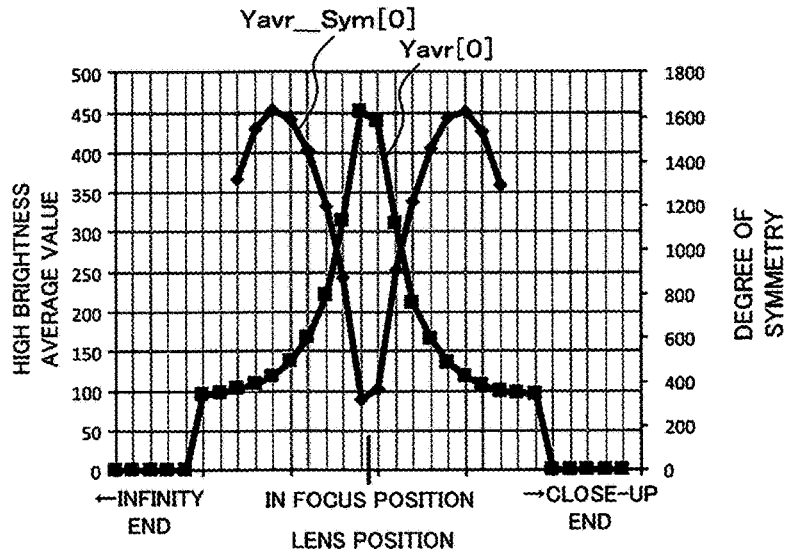

Next, examples of high brightness evaluation values and symmetry evaluation values are shown using FIG. 6A to FIG. 7C. FIG. 6A to FIG. 6C show examples where high brightness evaluation values and symmetry evaluation values, that have been calculated using judgment value Th0, have been calculated, based on an image of a subject of a starry sky, so as to exhibit maximum brightness value Ymax, as shown in FIG. 4B. Specifically, FIG. 6A shows high brightness pixel number Ycnt[0] and high brightness pixel number Ycnt_Sym[0] corresponding to focus lens position. Also, FIG. 6B shows high brightness sum value Ysum[0] and high brightness sum value Ysum_Sym[0] corresponding to focus lens position. FIG. 6C shows high brightness average value Yavr[0] and high brightness average value Yavr_Sym[0] corresponding to focus lens position.

Figure 7A:
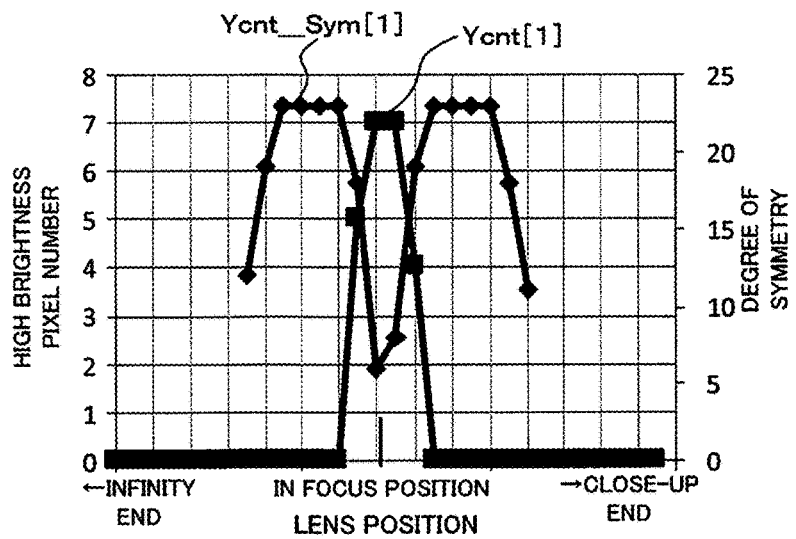
FIG. 7A to FIG. 7C are graphs showing high brightness evaluation values and symmetry evaluation values, in the camera of one embodiment of the present invention.
Figure 7B:
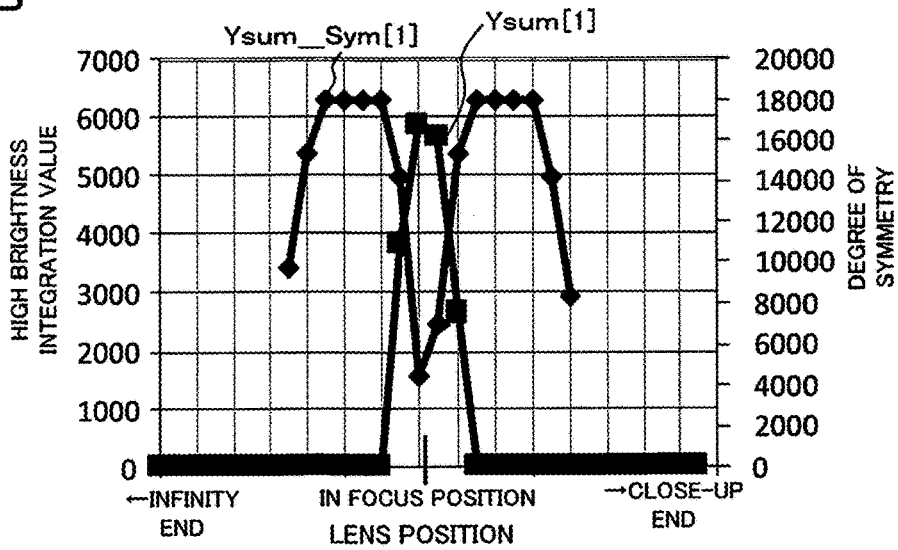
Figure 7C:
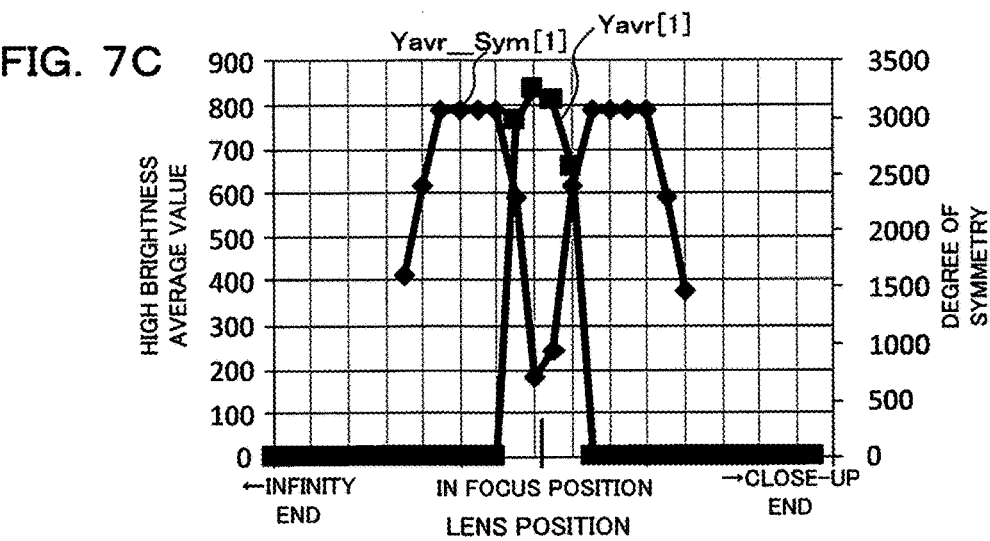

FIG. 7A to FIG. 7C show examples where high brightness evaluation values and symmetry evaluation values that have been calculated using judgment value Th1, have been calculated, based on an image of a subject of a starry sky, so as to exhibit maximum brightness value Ymax, as shown in FIG. 4B. Specifically, FIG. 7A shows high brightness pixel number Ycnt[1] and high brightness pixel number Ycnt_Sym[1] corresponding to focus lens position. Also, FIG. 7B shows high brightness sum value Ysum[1] and high brightness sum value Ysum_Sym[1] corresponding to focus lens position. FIG. 7C shows high brightness average value Yavr[1] and high brightness average value Yavr_Sym[1] corresponding to focus lens position.

As will be understood from FIG. 4B and FIG. 6A to FIG. 7C, extreme values of respective symmetry evaluations coincide with in focus position. Accordingly, symmetry evaluation values are calculated based on any of the seven types of high brightness evaluation values (maximum brightness value high brightness pixel number, high brightness sum value, high brightness average value), and it is possible to obtain a focus lens position where this symmetry evaluation value becomes an extreme value as an in focus position. In this embodiment, seven types of symmetry evaluation value are calculated, but calculating any one of the seven types is sufficient, and reliability of extreme value by may be judged by calculating two or more symmetry evaluation values.

Next, detection of in focus position in a case where maximum brightness value is not saturated at an initial position of the focus lens but is saturated during scan movement will be described using FIG. 8. At an initial position of the focus lens, such as Ymax_3, Ymax_4 that were shown in FIG. 3, the maximum brightness value is not saturated, but there are cases where as the focus lens approaches an in focus position the maximum brightness value is saturated. It is difficult to estimate whether or not there will be saturation close to an in focus position from a taken image for the initial position of the focus lens.

With this embodiment, high brightness evaluation values are calculated as was described previously, and symmetry evaluation values are calculated based on these high brightness evaluation values. Maximum brightness value Ymax corresponding to previously described Ymax_3 and Ymax_4, is shown in FIG. 8, and a maximum brightness value Ymax_sym to which symmetry processing has been applied based on this maximum brightness value Ymax is also shown. As will be understood from FIG. 8, in a period when focus lens position is L1 to L2, a maximum brightness value is in a saturated state. If the maximum brightness value becomes saturated, it is not possible to obtain an extreme value of the maximum brightness value using 3-point interpolation etc. However, with this embodiment, by calculating symmetry evaluation value Ymax_sym resulting from applying symmetry processing to the maximum brightness value Ymax, it is possible to calculate an evaluation value that has had the effects of saturated portions reduced as a symmetry evaluation value. It is possible to calculate in focus position of the focus lens with good precision based on an extreme value of this symmetry evaluation values Ymax_sym. It is possible to further obtain in focus position with better precision using interpolation processing of data in the vicinity of an extreme value of Ymax_sym.

Figure 8:
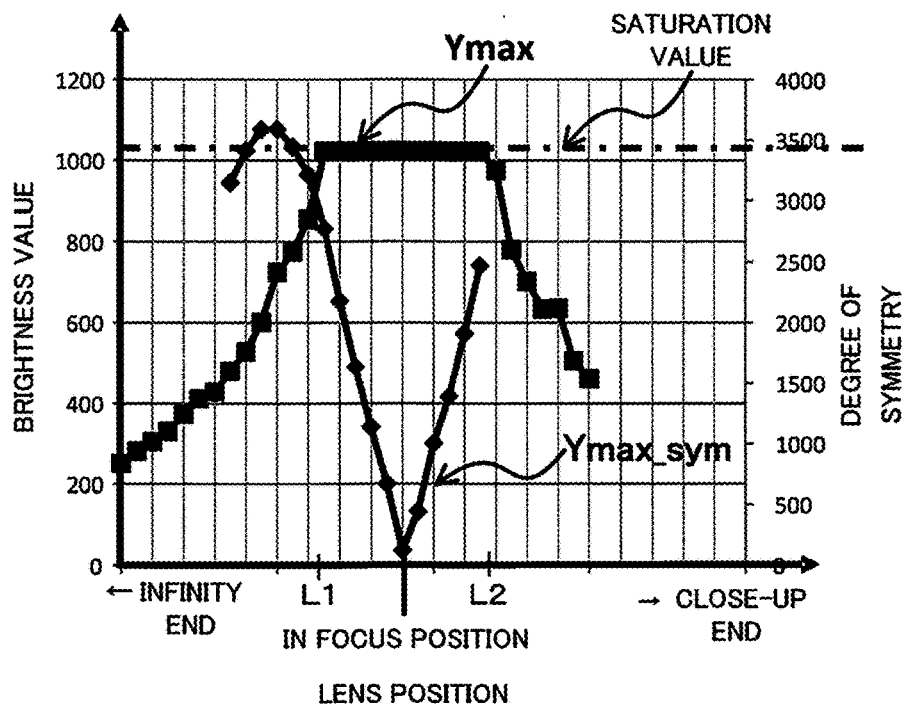
FIG. 8 is a graph showing symmetry evaluation values for a case where a maximum brightness value is saturated during movement of a lens, in the camera of one embodiment of the present invention.

Whether or not there is saturation during movement such as shown in FIG. 8 can not be determined accurately at the initial position of the focus lens, even if maximum brightness value and a judgment value are compared. Accordingly, it is possible to detect in focus position even in almost saturated states by carrying out symmetry processing such as was explained using FIG. 8 if the judgment value is not exceeded (refer to S77 and S81 in FIG. 15, and S95 and S97 in FIG. 16, etc.).

Next, detection of in focus position in a case where maximum brightness value exceeds the judgment value at the initial position of the focus lens, or a case where the maximum brightness value is already saturated, will be described using FIG. 9. There are cases where, at an initial position of the focus lens, such as Ymax_5 that was shown in FIG. 3, the maximum brightness value Ymax is already saturated, and where the maximum brightness value Ymax is also continuously saturated during a scan operation. Even if symmetry processing is applied when the maximum brightness value Ymax is in the saturated state over the whole scan range, symmetry evaluation value Ymax_sym becomes flat and it is not possible to detect an extreme value. Detection of in focus position is therefore carried out utilizing high brightness evaluation values other than the previously described maximum brightness value Ymax. With this embodiment, detection of in focus position is carried out by focusing on high brightness pixel number Ycnt among the previously described high brightness evaluation values.

Figure 9:
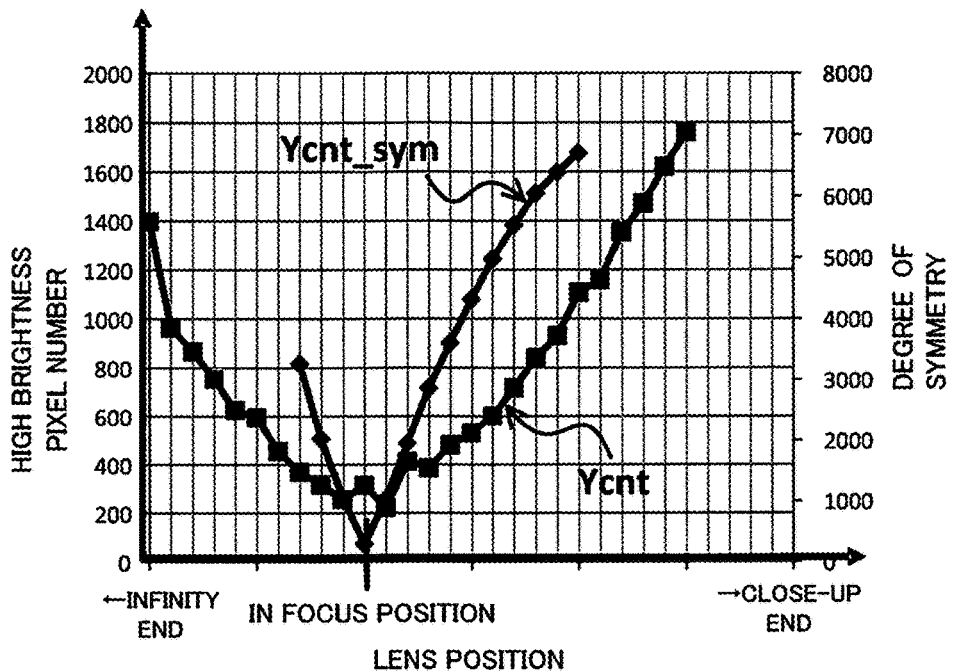
FIG. 9 is a graph showing high brightness evaluation values for a case where a maximum brightness value is already saturated at an initial position of a lens, in the camera of one embodiment of the present invention.

In FIG. 9, the maximum brightness value Ymax is already saturated at the initial position of the focus lens and the whole scan range region is also in a saturated state. In this type of state the number of pixels that are saturated changes in accordance with focus lens position, and so high brightness pixel number Ycnt traces a gentle concave curve, and the vicinity of a minimum value becomes a focus point. Specifically, in a state where there is blurring, there are lots of saturated pixels, the number of saturated pixels decreases as an in focus state is approached, and at an in focus position the number of saturated pixels become smallest. However, if there is camera shake and variation in brightness of heavenly bodies, there is a significant fluctuation error in data values in the vicinity of a minimum value for the high brightness pixel number Ycnt, and errors arise with interpolation processing. If this happens, a problem arises in that detection precision of a focused point is reduced.

Therefore, as shown in FIG. 9, symmetry processing is applied to the high brightness pixel number Ycnt, and symmetry of the high brightness pixel number Ycnt is evaluated to obtain symmetry evaluation values Ycnt_sym. In this way, because it is possible to average fluctuation components of high brightness pixel number caused by change in brightness of heavenly bodies and camera shake at every focus lens position (low pass filter effect), it is possible to reduce the effects of fluctuation and it is possible to reliably obtain an extreme value. Further, it is possible to also reduce errors due to interpolation processing of neighboring data, and to improve detection precision of an focused point.

Next, focused point detection in a case where a plurality of heavenly bodies (for example, stars) of different brightness exist in the AV evaluation region AFVA will be described using FIG. 10A to FIG. 11. The manner of blurring for a star image varies for every star of different brightness if the focus lens approaches a focused point from a position that is a distance from the vicinity of a focused point, and brightness also varies in accordance with this.

Figure 10A:
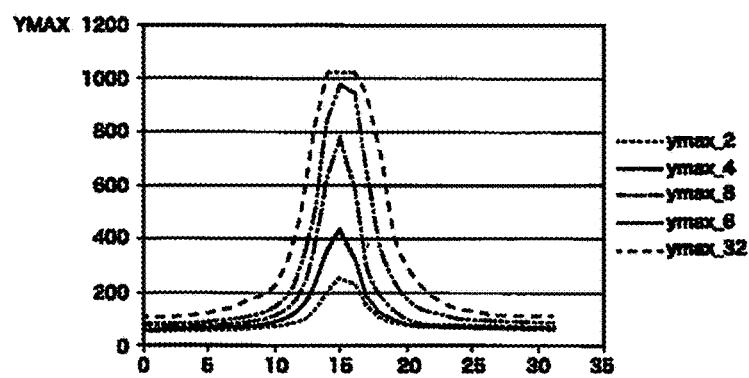
FIG. 10A to FIG. 10D are graphs showing characteristic variation due to brightness level of a single point light source, in the camera of one embodiment of the present invention.
Figure 10B:
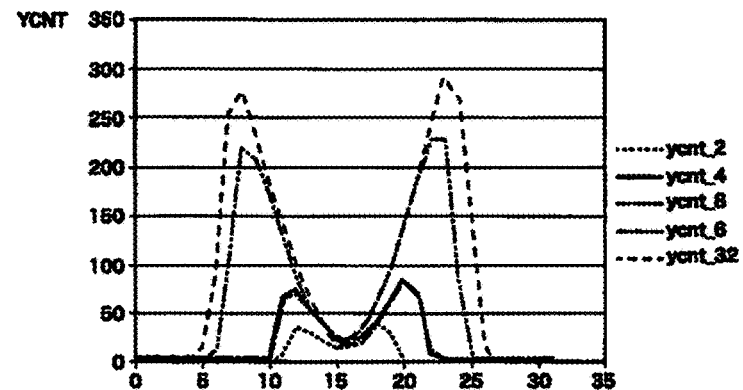
Figure 10C:
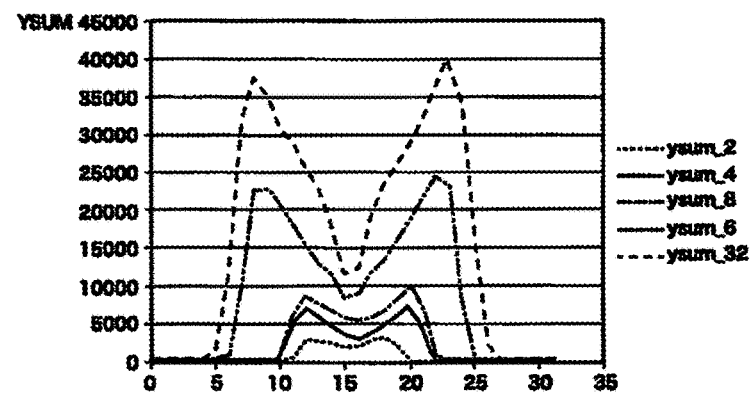
Figure 10D:
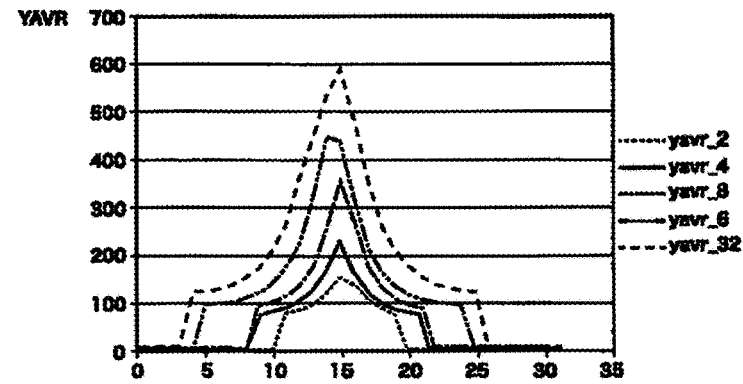

FIG. 10A to FIG. 10D show characteristic variations for respective point light sources in accordance with focus lens position, for five types of point light source (for example, stars) of differing brightness. FIG. 10A shows change in maximum brightness value Ymax, FIG. 10B shows change in number of high brightness pixels Ycnt that have exceeded a given judgment value, FIG. 10C shows high brightness sum value Ysum having exceeded a given judgment value, and FIG. 10D shows high brightness average value Yavr obtained by dividing high brightness sum value Ysum by a corresponding high brightness pixel number Ycnt.

In the event that a plurality of heavenly bodies of differing brightness exist within a region of the AV evaluation region AFVA, brightness change such as shown in FIG. 10A arises in accordance with respective brightness of the plurality of the bodies, and respective high brightness evaluation values of the AV evaluation region AFVA change such that changes in accordance with the plurality of heavenly bodies of different brightness start to overlap, or build up. This makes it difficult to judge whether or not an extreme value of high brightness evaluation value further than a maximum brightness is valid.

FIG. 11 is a graph plotting high brightness pixel number Ycnt for every focus lens position in a scene where a plurality of heavenly bodies of different brightness exist. As will be understood from the drawing, the resultant plot is a combination of characteristics of bright point light sources and dark point light sources in FIG. 10B. As a result, the high brightness pixel number Ycnt of FIG. 10B has a plurality of peak values, and does not have a distinct extreme value. Symmetry evaluation values Ycnt_sym resulting from applying symmetry processing to this high brightness pixel number Ycnt give a characteristic exhibiting a minimum value at an in focus position. For high brightness integration values Ysum_sym and high brightness average values Yavr_sym of a scene in which a plurality of heavenly bodies of different brightness exist also, it is possible to obtain a minimum value corresponding to an in focus position by similarly applying symmetry processing and calculating symmetry evaluation values. In this way, even if a plurality of heavenly bodies of differing brightness exist within the AV evaluation region AFVA and the high brightness evaluation values exhibit a complex characteristic, it is possible to detect an in focus position simply and with good precision by applying symmetry processing.

In this way an extreme value is obtained by applying symmetry processing to high brightness evaluation values, and in focus position of the focus lens is determined based on this extreme value. This means that it is possible to calculate in focus position regardless of a characteristic being of a convex shape or concave shape either side of the in focus position, and regardless of whether there is a maximum or a minimum close to the focused point position. Specifically, it is possible to calculate position of an extreme value corresponding to in focus position regardless of the offset, number of peaks or shape (maximum, minimum etc.) of a characteristic curve of the high brightness evaluation values.

Also, as a result of obtaining position using symmetry processing, since the effects of noise in characteristic data is averaged and therefore reduced for every focus lens position, it is possible to calculate in focus position with better precision. Compared to a focused point that has been calculated by subjecting high brightness evaluation values to three point interpolation processing directly, a focused point calculated by interpolation based on respective three-point data that has been calculated from image data for a window width by symmetry processing (an extreme value and the points in the vicinity thereof) can be a data with more image information added. By carrying out symmetry processing the effects of camera shake and heavenly body flicker are reduced.

Next, operation of the camera of this embodiment will be described using the flowcharts shown in FIG. 12 to FIG. 17. This operation is executed by the BCPU 60 controlling each section of the camera in accordance with programs that have been stored in the flash ROM 64. Also, this flowchart mainly shows operation relating to automatic focus adjustment carried out using high brightness evaluation values or contrast values.

Mount processing shown in FIG. 12 is commenced if a power supply button of the camera is operated. If the flow for mount processing is started, first the power supply of the body is turned on (S1). Here, power is supplied to each section of the camera body 11 by the power supply circuit 80.

Once the body has had its power supply turned on, next camera system initialization is carried out (S3). Here, initialization of the camera system is carried out, such as supplying power to the image processing controller 62, launching the OS (operating system), providing power to the image sensor within the imaging unit 54, restoring states at the time of the previous power supply off, etc.

If initialization of the camera system is being carried out, next power supply of the lens barrel is turned on (S5). Here power to each section within the lens barrel 12 is supplied by the power supply circuit 18 by means of the communication connector 35 stock Once the lens power supply has been turned on, next initial communication is carried out (S7). Here, transmission from the camera body 11 is carried out, and based on a response from the lens barrel 12 communication protocol authentication is carried out.

Once initial communication has been carried out, next communication for acquiring lens performance information is carried out (S9). Here, a request to send lens performance information that is stored in the memory 31, for example, information such as whether it is a zoom lens or a prime lens, focal length, aperture value (F value) etc. is sent to the LCPU 30 and this information is acquired.

Once lens performance information has been acquired, next lens function information acquisition communication is carried out (S11). Here, a request to send lens function information, for example, information such as communication speed, lens drive speed, whether there is a lens shake correction function etc. is sent to the LCPU 30 and this information is acquired.

Once lens function information has been acquired, next lens optical information acquisition communication is carried out (S13). Here, a request to send lens optical information that is stored in the memory 31, such as, for example, distortion data, spectral transmittance etc. is sent to the LCPU 30 and this information is acquired. Each of the items and information that have been acquired in steps S9 to S13 are stored in the flash ROM 64 or the SDRAM 63, and are used at the time of various processing such as AF processing using high brightness evaluation values or contrast AF processing etc.

Once the lens optical information has been acquired, next shooting information display is carried out (S17). Here shooting information such as shooting mode, shutter speed, aperture value, ISO sensitivity etc. is displayed on the operation display LCD 77.

Once shooting information display has been carried out a shooting standby state is entered (S19). Here, a shooting standby state is entered until a half press operation of the release button or the like is performed. In this standby state, for example, live view is displayed based on image data from the image sensor, various settings such as shooting mode etc. are received, and if the power supply button is turned off, power supply off processing is carried out.

Next, a shooting sequence will be described using the flowchart shown in FIG. 13. The shooting sequence starts if an operation such as a half press operation of the release button is performed in the shooting standby state.

If the flow for the shooting sequence is started, first photographing lens state acquisition communication is carried out (S21). Here, a request to send the latest states of the lens barrel, such as latest aperture state of the aperture 22, latest zoom state of the photographing lens 21 (including focal length) etc. is sent to the LCPU 30 and this information is acquired.

Once lens state acquisition communication has been carried out, it is next determined whether or not the 1RSW is on (S23). If the release button is pressed down half way, the 1RSW is turned on. Here, determination is based on on-off state of the 1RSW. If the result of this determination is that 1RSW is off, processing returns to step S21 and the operations described above are periodically repeated.

On the other hand, if the result of determination in step S23 is that the 1RSW is on, AF operation is carried out (S25). Here, contrast AF or an AF operation based on high brightness evaluation values is carried out. With contrast AF contrast evaluation values are generated by extracting high frequency components of image data from the image sensor and adjusting position of the focus lens so that this contrast evaluation value becomes a peak. Also, with an AF operation based on high brightness evaluation values, as was described using FIG. 2 to FIG. 11, an in focus position is detected using high brightness evaluation values and symmetry evaluation values resulting from applying symmetry processing to the high brightness evaluation values. If focus is correctly detected and the focus lens is driven to the in focus position, "1" is set in an in focus flag. Detailed operation of this AF will be described later using FIG. 14.

If AF operation has been carried out, next it is determined whether or not the in focus flag is "1" or "0" (S27). The in focus flag has a default value of "0", and as was described previously "1" is set as the in focus flag if the focus lens has been driven to the in focus position.

If the result of determination in step S27 is that the in focus flag is "0", non-focusing processing is carried out (S41). As non-focusing processing there is, for example, displaying the fact that there is a non-focus state on the EVF 66 etc., notifying that there is no focused to the photographer, and stopping drive of the focus lens.

On the other hand if the result of determination in step S27 is that the in focus flag is "1", it is determined whether or not the 1R switch (1RSW) is off (S29). If the photographer releases the half-pressed state of the release button, the 1RSW enters an off state. If the determination in step S29 is off, processing returns to step S21 and the previously described operations are repeated.

If the result of determination in step S29 is not that the 1RSW is off, lens state acquisition communication is carried out (S31). Here, similarly to step S21, a request to send the latest states of the lens barrel is sent to the LCPU 30, and this information is acquired.

Once lens state acquisition communication has been carried out, it is next determined whether or not the 2R switch (2RSW) is on (S33). If the release switch has been pressed down fully, the 2RSW is turned on. Here, determination is based on on-off state of the 2RSW. If the result of this determination is that 2RSW is off, processing returns to step S31 and the operations described above are repeated.

On the other hand, if the result of determination in step S33 is that the 2RSW is on, there is a transition to a shooting operation. First, an exposure operation is carried out (S35). Here, the shutter 52 is opened and a subject image is formed on the surface of the image sensor of the image sensor unit 54, and after the exposure time has elapsed the shutter 52 is closed and exposure is completed. Once exposure has been completed, image data is read out from the image sensor.

If the exposure operation has been completed, next image processing is carried out (S37). Here, the image processing controller 62 applies various image processing for image storage to image data that has been read out from the image sensor.

Once image processing has been carried out, card storage is next carried out (S39). Here, the image data that was subjected to image processing in step S37 is stored in the storage media 65. Once card storage has been carried out in step S39, or if non-focusing processing has been carried out in step S41, the flow for the shooting sequence is terminated and the originating flow is returned to.

Figure 14:
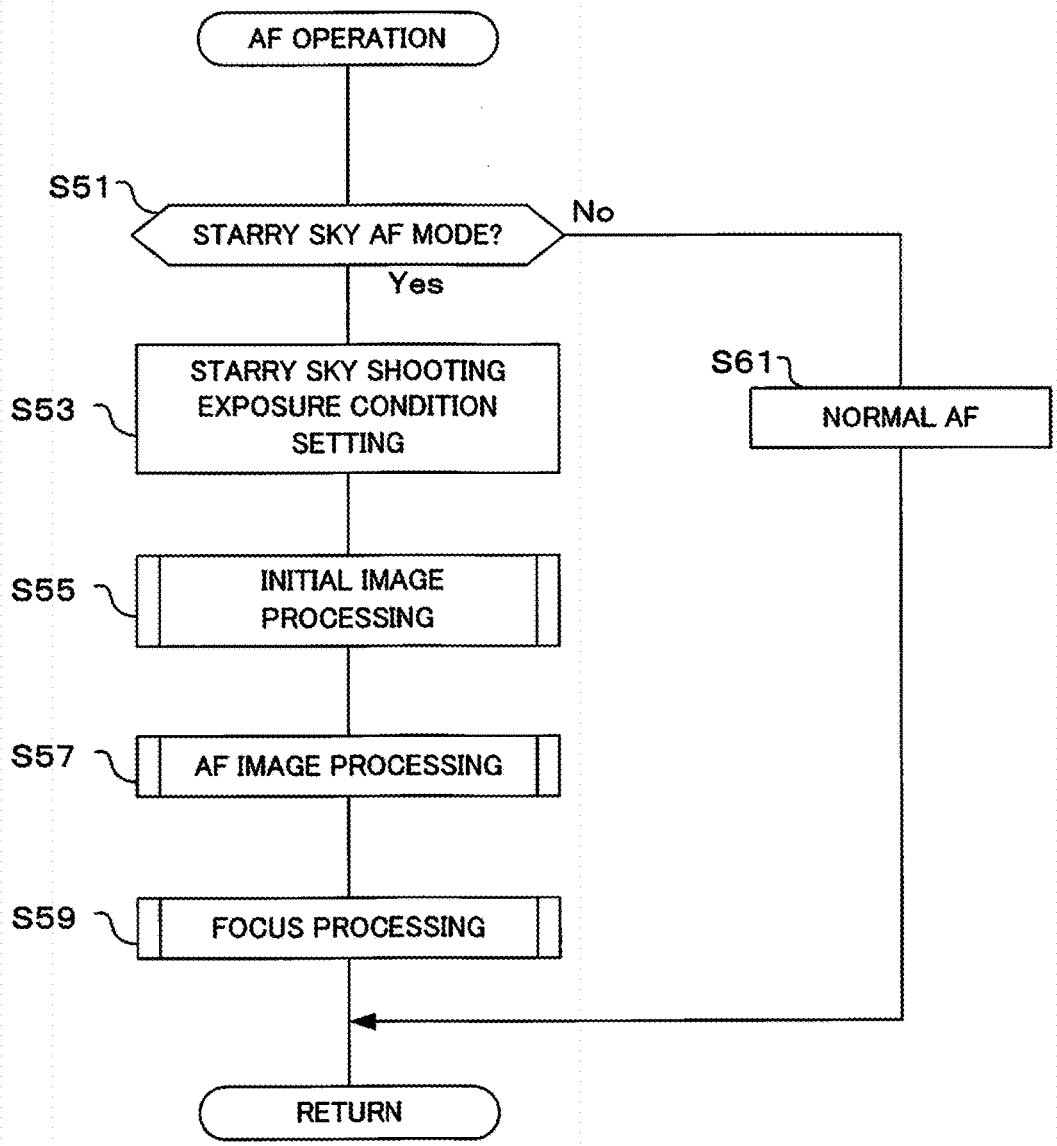
FIG. 14 is a flowchart showing AF operation of the camera of one embodiment of the present invention.

Next, detailed operation of the AF operation in step S25 will be described using the flowchart shown in FIG. 14.

If the flow for AF operation is entered, it is first determined whether or not it is starry sky AF mode (S51). Starry sky AF mode is manually set by the photographer operating a menu button or an OK button within the camera operation SW78. In the event that starry sky AF mode has been set by manual setting, the focus lens position may be moved based on optical infinity position information that has been stored in the memory 31 as unit specific information for every interchangeable lens. Also, starry sky AF mode may be set automatically by analyzing image data from the image sensor, and determining level of background brightness and whether or not heavenly bodies such as stars have been captured etc. Also, in the event that focusing was not possible in starry sky AF mode, the focus lens may be moved to the optical infinity position.

If the result of determination in step S51 is that it is not starry sky AF mode, normal AF is carried out (S61). Here, as a result of contrast AF etc. contrast value of image data from the image sensor is detected, and position of the focus lens is moved to a position at which this contrast value becomes a peak. It should be noted that as the normal AF operation, as well as contrast AF, it is also possible to use another AF operation such as, for example, phase difference AF.

On the other hand, if the result of determination in step S51 is starry sky AF mode, then in step S53 and after AF operation is executed using the high brightness evaluation values and symmetry evaluation values that were described using FIG. 2 to FIG. 11. First, setting of exposure conditions for starry sky shooting is carried out (S53). Here, exposure conditions that are appropriate to starry sky shooting are set, such as, for example, setting aperture to a wide-open value, setting shutter speed to a prolonged time shutter speed, and also setting ISO sensitivity to high sensitivity.

Next, initial image processing is carried out (S55). Here, the focus lens is moved to a control infinity position, an average brightness is obtained, and it is determined whether or not an average brightness value is greater than or equal to a given value. If the average brightness is greater than or equal to the given value, namely that it is too bright a scene with a background of too high brightness, the in focus flag remains at "0" and the AF operation is terminated (not shown). Detailed operation of this initial image processing will be described later using FIG. 15.

Once initial image processing has been carried out, next AE image processing is carried out (S57). Here, image data is acquired by scan drive etc., this acquired image data is converted to luminance image data, and further, high brightness evaluation values and symmetry evaluation values are calculated. Detailed operation of this AF image processing will be described later using FIG. 16.

Once AF image processing has been carried out, next focus processing is carried out (S59). Here, in focus position is calculated using symmetry evaluation values calculated by AF image processing, the focus lens is moved to this calculated in focus position, and the in focus flag is set to "1". However in the event that is not possible to detect in focus position here, the focus lens is moved to the optical infinity position in individual information of the interchangeable lens and the in focus flag is set to "0". Detailed operation of this focus processing will be described later using FIG. 17.

If focus processing has been carried out in step S59, or if normal AF processing has been carried out in step S61, the flow for the AF operation is terminated and the originating flow is returned to.

Next, detailed operation of the initial image processing in step S55 will be described using the flowchart shown in FIG. 15.

If the flow for initial image processing is entered, first initial position movement is carried out (S71). Here the focus lens is moved to the control infinity position as the initial position. The optical infinity position of the photographing lens 21 differs very slightly depending on the individual lens barrel. This means that although optical infinity physician information is also stored in the memory 31 as interchangeable lens specific information, there may be situations where there is very slight fluctuation due to variation in gravitational load of the camera depending on the shooting direction of the camera, variation in ambient temperature etc. Accordingly, a position that is further to the infinity side than an assumed optical infinity position is calculated as an initial position on the basis of subject depth of field Fδ and number of measuring steps, and the lens is moved to that position. At this time, if the initial position becomes further to the infinity side than the control infinity position, the control infinity position is set as the initial position. Here, the BCPU 60 moves the focus lens as far as the initial position using the lens drive circuit 25 by means of the LCPU 30.

Once initial position movement has commenced, it is determined whether or not the focus lens has been stopped (S73). Here it is determined whether or not the focus lens has reached the initial position or the control infinity position, and stopped. If the focus lens has not stopped, the routine waits until the initial position is reached and the focus lens stops.

If the result of determination in step S73 is that the focus lens is stopped, next average brightness is calculated (S75). Here, average brightness in the AV evaluation region AFVA is calculated based on image data from the image sensor in the image sensor unit 54. Average brightness value represents total brightness including background of the AV evaluation region AFVA (total brightness value per unit pixel) is obtained. If this value is greater than or equal to a given brightness (S76 Yes), it is determined that background brightness is high and that it is a bright scene, and an AF operation is stopped. In this case, the in focus flag is set to 0 (S82) and the process returns, and if processing for the AF operation that was shown in FIG. 14 also returns then non-focusing processing is carried out in step S41. Also, in the event that average brightness value is less than a given brightness (S76 No), then a given value is added to or a coefficient is multiplied by that value, and the resulting value is set to a judgment value Th0 as a value that is slightly higher than the background brightness value.

If an average brightness has been calculated and the result of determination in step S76 is No, next high brightness pixel determination is carried out (S77). Here it is determined whether or not a maximum brightness value is higher than the saturation judgment value that was described using FIG. 3. It should be noted that this judgment, besides a maximum brightness value, may be carried out based on, for example, high brightness pixel number Ycnt or high brightness sum value Ysum etc. at the initial position, and a given judgment value. For example, a high brightness evaluation value of high brightness pixel number Ycnt[1] and high brightness sum value Ysum[1] using a higher setting value Th1 is determined as a given value or higher etc.

If the result of determination using high brightness pixels in step S77 is that the maximum brightness value is greater than or equal to a judgment value, the flag SATflag is set to ON (S81). Specifically, the flag SATflag is set if the maximum brightness value is already saturated at the initial position or is predicted to be saturated in the vicinity of a focus point. On the other hand if it has been estimated that high brightness pixels will not be saturated, the flag SATflag is set to OFF (S79). Specifically, it is estimated that the maximum brightness value will not be saturated even in the vicinity of an in focus position, and the flag SATflag is reset.

If setting or resetting of the flag SATflag has been carried out in step S79 or S81, the flow for initial image processing is terminated and the originating flow is returned to.

Next, detailed operation of the AF image processing in step S55 (FIG. 14) will be described using the flowchart shown in FIG. 16.

If the flow for AF image processing is entered, first, scan drive is commenced (S91). Here, the focus lens is moved at the previously described lens speed LDspeed from the control infinity position towards the close up end. A target position this time is also set and the focus lens is moved to this position. As target position, as was described previously, a position is set to such an extent as to cover a measurement range of about +30Fδ [μm] in the vicinity of in focus position, for example.

Next, a luminance image is acquired (S93). Here, a subject image is exposed using the image sensor in the state where the focus lens has been moved, and once exposure time for one frame (for example, 30 fps) has elapsed image data is acquired from the image sensor. Image data is RAW data, and so this RAW data is converted to luminance image data.

Once luminance image acquisition has been carried out, it is next converted to evaluation data (S95). Here high brightness evaluation values are calculated based on the luminance image data that was acquired in step S93. As the high brightness evaluation values, as was described previously, with this embodiment there are seven types, being maximum brightness value Ymax, high brightness pixel number Ycnt[0], high brightness sum value Ysum[0], high brightness average value Yavr[0], high brightness pixel number Ycnt[1], high brightness sum value Ysum[1], and high brightness average value Yavr[1]. However, it is not necessary to calculate all of these brightness values, and only at least one may be calculated.

It should be noted that when carrying out calculation for high brightness evaluation, in the event that a saturated state has been determined by initial image processing (in this case, SATflag=ON), symmetry evaluation using maximum brightness value Ymax within the AV evaluation region AFVA is not carried out, and symmetry evaluation is carried out using high brightness pixel number Ycnt (FIG. 9). On the other hand, in the event that a non-saturated state has been determined by initial image processing (in this case SATflag=OFF), symmetry evaluation is carried out on maximum brightness value Ymax within the AV evaluation region AFVA. Symmetry evaluation may also be carried out using other high brightness evaluation values.

Once evaluation data conversion has been carried out, next symmetry evaluation is carried out (S97). Here, symmetry evaluation is carried out based on evaluation data that was obtained in step S95. As symmetry evaluation, with this embodiment, as was described previously, there are seven types, namely, maximum brightness value Ymax_Sym, high brightness pixel number Ycnt_Sym[0], high brightness sum value Ysum_Sym[0], high brightness average value Yavr_Sym[0], high brightness pixel number Ycnt_Sym[1], high brightness sum value Ysum_Sym[1], and high brightness average value Yavr_Sym[1]. However, it is not necessary to calculate all of these, and symmetry evaluation values may be calculated from high brightness evaluation values that have been calculated by the previously described evaluation data conversion processing. Also, since, in evaluating symmetry, image data of a window width (2w+1) as was described previously is required, this processing (S97) is not executed at all and is simply bypassed until that number of data items have been completed.

Once symmetry evaluation has been carried out, it is next determined whether or not it is at the lens stop position (S99). Here it is determined whether or not the target position that was set in step S91 has been reached. Alternatively, in the event that displacement between the current focus lens position and the previous focus lens position is less than or equal to a set value, stop is determined.

If the result of determination in step S99 is not the lens stop position, it is next determined whether or not symmetry detection is complete (S101). Symmetry evaluation is carried out in step S97, but regarding symmetry evaluation, only an extreme value need to be detected, and if it is possible to detect an extreme value of high reliability before target position that was set in step S91 is reached, calculation for symmetry evaluation may be completed at that point in time. For example, maximum value and minimum value of symmetry values are constantly stored and updated during symmetry processing. Detection may be completed if minimum value, which is an extreme value, is no longer updated and a current value starts to increase, and further if a value, of a difference between maximum value and minimum value being multiplied by a given ratio, is exceeded. If the result of determination in step S101 is not that symmetry detection is complete processing returns to step S93 and the previously described processing is carried out.

On the other hand, if the result of determination in step S99 is that lens stop has been determined, or if the result of determination in step S101 is that symmetry detection has been completed, it is next determined whether or not scan drive is in progress (S103). If the result of this determination is that scan drive is in progress, scan drive is stopped (S105). Here, the BCPU 60 stops drive of the focus lens using the lens drive circuit 25 by means of the LCPU 30.

If scan drive has been stopped in step S105, or if the result of determination in step S103 is that scan drive is not in progress, the flow for AF image processing is terminated and the originating flow is returned to.

It should be noted that in this flow for AF image processing, a luminance image was acquired while carrying out scan drive. However, this is not limiting, and a luminance image may also be required while carrying out the previously described lens step drive operation. In this case, lens step drive is carried out and a luminance image is acquired at a position where the focus lens is stopped.

Next, detailed operation of the focusing processing in step S59 (FIG. 14) will be described using the flowchart shown in FIG. 17.

If the flow for focusing processing is entered, first a focusing range is calculated (S111). The focusing range represents an range in which focusing is permitted, and is used to make a case where a calculated focus point is outside the focusing range, invalid. In the case of using a plurality of symmetry evaluation values, focusing range is obtained based on reference high brightness evaluation values and symmetry evaluation values, and using this focusing range, the focusing range gives valid processing results when limiting a range of in focus position for other symmetry evaluation values. In processing for symmetry valuation, within image data i that has been taken in accordance with focus lens position, a range for calculating symmetry becomes from i=w to i=t_no−w−1 (w is calculation width of one end where symmetry is calculated, t_no is a number of taken images).

Therefore, in the case of calculating symmetry evaluation values Ymax_sym from maximum brightness value Ymax of high brightness evaluation values, a value of a given ratio (smaller than 1) for a difference between maximum value and minimum value of high brightness evaluation values for respective taken image positions (focus lens positions) is calculated. For example, a range other than a range of maximum brightness value Ymax that exceeds this calculated value, ranging from the reference maximum value of maximum brightness value Ymax, is made a focusing range. In this case, a range that is narrower than the range of from w of the infinity side to t_no−w−1 of the close up side is obtained as a focusing range. Also, in the case of symmetry evaluation value Ymax_sym of a maximum brightness value Ymax, calculation values are similarly calculated, a range that is smaller than a range of calculation values is similarly obtained with a minimum value of symmetry evaluation values Ymax_sym as a reference, and this range is set as the focusing range. Also, a focusing range that is more to the center within this plurality of focusing ranges may also be made a final focusing range.

Even with symmetry evaluation values of high brightness evaluation values other than maximum brightness value Ymax it is possible to limit the focusing range with similar processing. Values of a given ratio of a difference between maximum value and minimum value of respective symmetry evaluation values are calculated, and a range that is smaller than this calculated value, for a range of from w of the infinity end to t_no−w−1 at the close up end, is obtained in the same manner. A range that is more to the center within the range that has been obtained is made of focusing range. Also, since setting value Th0<Th1, it is possible to more narrowly restrict the focusing range with evaluation for Th1. In a case where difference between maximum value a minimum value for respective data is 0, that evaluation data is not used.

If focusing range has been calculated, next in focus position is calculated (S113). Next it is verified whether a position corresponding to an extreme value for symmetry evaluation that was calculated in step S97 has entered a focus range that was calculated in step S111. If there is an extreme value in the focus range, this is made focus image position Fc_id. In a case where high brightness evaluation value is maximum brightness value Ymax, an extreme value position of a symmetry evaluation value Ymax_sym of a maximum brightness value is made focus image position Fc_id, and an interpolated image position Fc_ip at a more accurate peak position is calculated, by interpolation processing, using symmetry of this position (symmetry evaluation values) and three point symmetry data (symmetry evaluation values) of step positions in the vicinity of this extreme value position. Next, pulse position of the focus lens, corresponding to taken images in the vicinity of interpolated image position Fc_ip that has been obtained, is obtained, pulse position of the focus lens is interpolated based on this interpolated image position Fc_ip, and the position is calculated as in focus position Fc_pos of the focus lens. Pulse position corresponding to position of the focus lens is simultaneously stored as pulse position information at the time of acquisition of each luminance image (S93 in FIG. 16).

In a case where other high brightness evaluation values are used, other than maximum brightness values, for example, it is possible to similarly obtain a focus position based on high brightness pixel number Ycnt and symmetry evaluation values Ycnt_sym of the high brightness pixel number. It is verified whether position of an extreme value of symmetry data is in the focus range, and if it is within the range it is possible to calculate a focused pulse position Fc_pos with interpolation processing using brightness value data of an extreme value similarly to as described above, and brightness values in the vicinity of that extreme brightness value.

Interpolation processing may use Gaussian function interpolation, or Lagrange interpolation etc. Also, focus pulse position Fc_pos of the focus lens is calculated based on interpolated image position Fc_ip that has been subjected to interpolation processing, but the focus pulse position Fc_pos can also be calculated directly by substituting pulse position, which is position of the focus lens, instead of an image position signal when calculating interpolated image position Fc_ip of peak position with interpolation processing.

In the aforementioned case where high brightness evaluation values are maximum brightness values, in a case where symmetry Ymax_sym of the maximum brightness values is not in a focusing range, or in a case where the focus image position cannot be found, it is verified whether position of an extreme value (maximum value) of the maximum brightness values Ymax is in the focusing range, and if the extreme value is within range it is possible to calculate focus pulse position Fc_pos from interpolation processing using brightness value data of the extreme value and brightness values in the vicinity of that brightness value data, similarly to as described above.

Six other types of symmetry data of high brightness evaluation values can be calculated, namely high brightness pixel number Ycnt_sym[0], high brightness sum value Ysum_sym[0], high brightness average value Yavr_sym[0], high brightness pixel number Ycnt_sym[1], high brightness sum value Ysum_sym[1], and high brightness average value Yavr_sym[1], and it is possible to calculate focus pulse position by selecting from among these symmetry data, giving priority to those that are within the focusing range.

It is also possible to calculate a final focus pulse position Fc_pos by, after obtaining all of focus image position Fc_id and interpolated image position Fc_ip by means of symmetry data of high brightness evaluation values, and focus pulse position Fc_pos, obtaining a mode for focus image position Fc_id from these positions, and averaging interpolated image position Fc_ip of symmetry evaluation values of high brightness evaluation values, or focus pulse position Fc_pos, that match the mode.

If focus pulse position Fc_pos has been calculated, next there is movement to the focus pulse position Fc_pos (S115). Here, the focus lens is moved to the focus pulse position Fc_pos that was calculated in step S113. Specifically, the BCPU 60 moves the focus lens as far as the focus pulse position Fc_pos using the lens drive circuit 25 by means of the LCPU 30.

Once focus pulse position movement has commenced, it is next determined whether or not there is lens stop (S117). If focus pulse position Fc_pos is reached, drive of the focus lens by the lens drive circuit 25 is stopped. In this step it is determined whether or not lens drive by the lens drive circuit 25 has been stopped. If the result of this determination is that lens drive has not stopped, the routine waits until a stop position is reached. On the other hand if the lens has stopped, the flow for focus processing is terminated and the originating flow is returned to.

Focus detection that has been described in this embodiment is executed when brightness values of an image of an AV evaluation region are in a low luminance state, and when "starry sky mode", "night view mode" etc. have been set. In order to focus on targeting point light sources of a focus point position that is at almost infinity, a focus lens is moved from a designed optical infinity position to a control infinity position that is further away, an initial image is taken here, and high brightness evaluation values are calculated from a luminance image of the evaluation region. Here, as the high brightness evaluation values that are calculated there are maximum values (maximum brightness values) of brightness values within the evaluation region, number of high brightness pixels that are above a given value (high brightness pixel number), high brightness sum values, etc. Also, at this initial position, background brightness is calculated from average brightness value of the entire evaluation region (total brightness value per unit pixel), and processing is stopped if background brightness is high (S75 in FIG. 15).

From dim low grade stars to a starry sky having bright high grade stars, it is possible to find focused point position at high speed and with good precision, with only a single AF scan processing, regardless of whether an image is saturated or not saturated, by detecting symmetry of high brightness evaluation values of point light sources while acquiring brightness data.

As has been described above, with one embodiment of the present invention, brightness values of pixels within a given evaluation region are detected on the basis of image data (for example, S93 in FIG. 16), high brightness evaluation values are calculated based on these brightness values (for example, S95 in FIG. 16), symmetry of the high brightness evaluation values is calculated for movement of the focus lens (for example, S97 in FIG. 16), and focus adjustment is carried out based on an extreme value calculated based on the symmetry (refer, for example, S115 in FIG. 17). As a result, it is possible to suitably perform focusing regardless of whether or not high brightness evaluation values are saturated, and even in a taken scene in which there are a plurality of stars.

Also, regarding the problem (1) described earlier, with this embodiment, since an extreme value is detected using symmetry evaluation, it is possible to detect in focus position with good precision even if brightness is saturated.

Also, regarding problem (2), with this embodiment, since an extreme value is detected using symmetry evaluation it is possible to detect in focus position with good precision even if a maximum brightness value and number of high brightness pixels varies. Also, even in a case where there are a plurality of stars etc. of differing brightness, by using symmetry evaluation extreme values take on a clearer characteristic, and it is possible to detect in focus position with good precision.

It should be noted that with the one embodiment of the present invention, description has been given for a case where focus adjustment has been carried out on heavenly bodies in a starry sky, but the subject of focus adjustment is not limited to being a heavenly body in a starry sky, and the present invention can be used in various situations, such as for a subject like a point light source that is far away within a night scene.

Also, with the one embodiment of the present invention, estimation is carried out regarding whether or not there is a saturated state, based on brightness values after movement to an initial position. High brightness evaluation values that will be processed are switched depending on the saturation determination result, the minimum required data is processed, and calculation load is reduced. However, restricting to this type of processing data is not limiting. It is possible to constantly carry out processing of the above described seven types of high brightness evaluation values and the respectively calculated symmetry evaluation values, to delete unnecessary processing results at the end, and to detect in focus position using only significant data.

Also, with the one embodiment of the present invention, description has been given for an example where there are two judgment values for when calculating high brightness pixel number etc., namely Th0 and Th1, but it is also possible to carry out determination by providing three or more judgment values. For example, in a case where a relationship Th0<Th1<Th2 holds, judgment value Th0 that has been calculated from average brightness value of an initial image is set to a value that is slightly higher than a background image, in order to give effective setting in detecting low grade dim stars. Also, Th2 is set to a fixed value of about 512 (if signal brightness maximum value=1023) in order to detect high-grade bright stars and heavenly bodies. Also, judgment value Th1 may be an intermediate value between Th0 and Th2 so as to detect heavenly bodies having a brightness between the two previously described levels. As a result of this type of processing, the probability of a signal being lost, from a taken scene in which level of a brightness signal is small until a scene where the level is large, is reduced, and it is possible to increase detection precision of a focused point by extracting data of high reliability from among processing results for a plurality of high brightness evaluation values and symmetry.

Also, in symmetry detection within the AF image processing (S57), and extreme value of symmetry is detected during scanning shooting and interim detection completion processing (S101) is carried out, but this is not limiting, and shooting of a previously assumed scanning range (S93) and calculation of symmetry (S97) may be executed until the end, and after that focusing range calculation (S111) and calculation of in focus position (S113) executed from all images of the scanning range.

Figure 13:
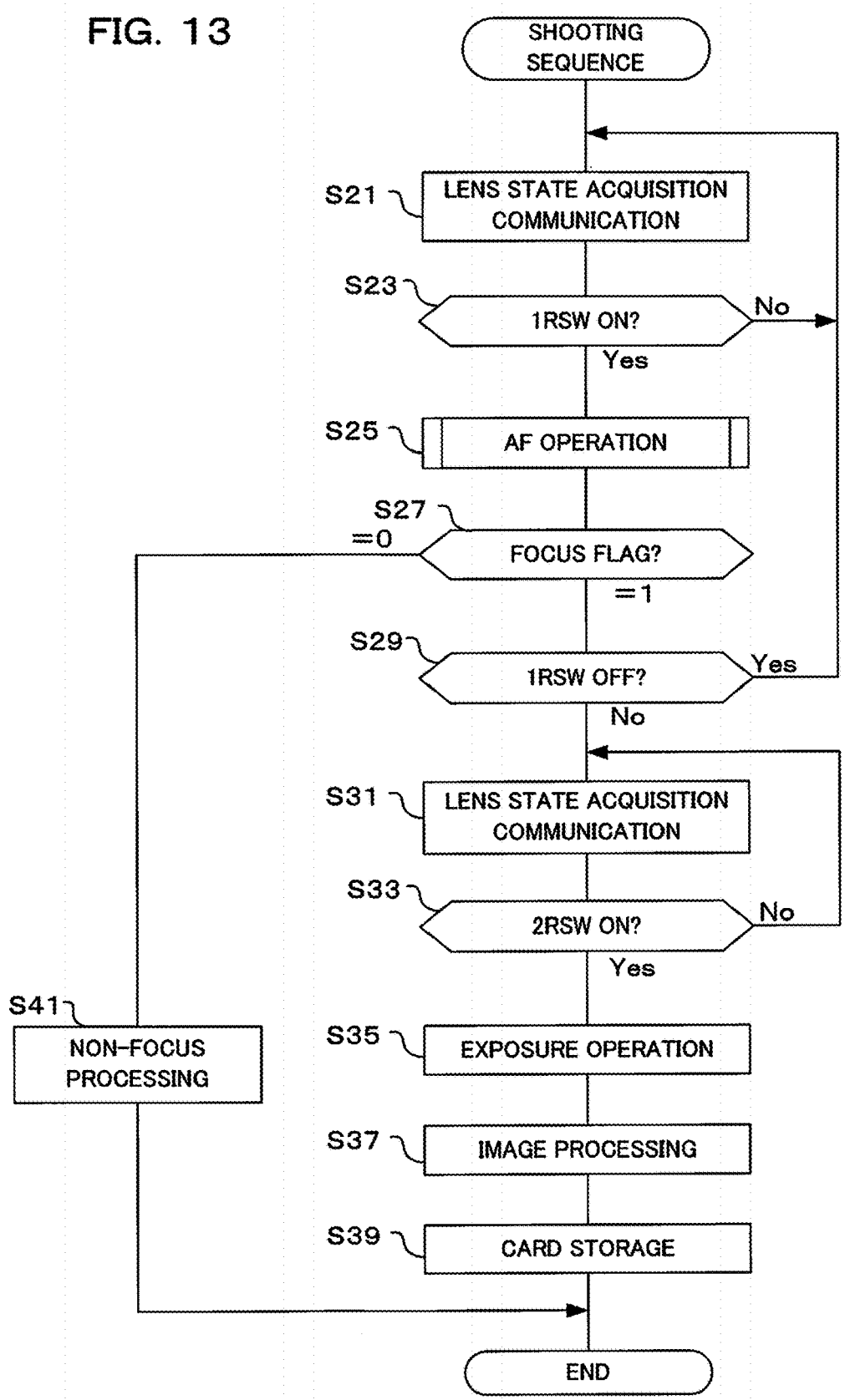
FIG. 13 is a flowchart showing a shooting sequence of the camera of one embodiment of the present invention.

Also, with the one embodiment of the present invention, description has been given for a case applied at the time of still picture shooting (refer, for example, to S33 in FIG. 13). However, this is not limiting, and the present invention can also be applied at the time of movie shooting. Also, while an example has been given such that the extreme value for symmetry evaluation can be a minimum value, extreme values for symmetry evaluation may be a maximum value.

Also, with the one embodiment of the present invention, an instrument for taking pictures has been described using a digital camera, but as a camera it is also possible to use a digital single lens reflex camera, a mirrorless camera, or a compact digital camera, or a camera for movie use such as a video camera, and further to have a camera that is incorporated into a mobile phone, a smartphone, a mobile information terminal, personal computer (PC), tablet type computer, game console etc., or a camera for medical use, or a camera for a scientific instrument such as a microscope, a camera attached to an astronomical telescope, a camera for mounting on a vehicle, a surveillance camera etc. In any event, it is possible to adopt the present invention as long as a device carries out focus adjustment for a subject that is a long distance away, such as at infinity.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:
1. An imaging apparatus, comprising:
a focus lens drive circuit that causes a focus lens to move in an optical axis direction,
an image sensor that acquires a plurality of image data while causing the focus lens to move in the drive direction, and
a processor that detects brightness values of pixels within a given evaluation region based on the image data, calculates high brightness evaluation values based on the brightness values, calculates symmetry of the high brightness evaluation values for movement of the focus lens, and carries out focus adjustment based on an extreme value calculated based on the symmetry.

2. The imaging apparatus of claim 1, wherein:
the high brightness evaluation values are brightness values representing maximum brightness within the evaluation region.

3. The imaging apparatus of claim 1, wherein:
the high brightness evaluation values are a number of pixels that exceed a given brightness value within the evaluation region.

4. The imaging apparatus of claim 1, wherein:
the high brightness evaluation values are sum values of brightness values of pixels that exceed a given brightness value within the evaluation region.

5. The imaging apparatus of claim 4, wherein:
the high brightness evaluation values are values resulting from dividing the sum value by a number of pixels that exceed the given brightness value.

6. The imaging apparatus of claim 1, wherein:
the processor sets a movement range of the focus lens in which a plurality of image data are acquired based on a ratio of maximum value to minimum value of a plurality of the high brightness evaluation values within the evaluation region and/or based on a ratio of maximum value to minimum value of symmetry of the high brightness evaluation values, and controls movement of the focus lens and acquisition of image data based on the movement range that has been set.

7. The imaging apparatus of claim 1, wherein:
the processor determines saturated state based on the brightness values, and if the result of this determination of saturated state is that a non-saturated state has been determined, makes the high brightness evaluation values brightness values representing maximum brightness within the evaluation region, and if a saturated state is determined makes the high brightness evaluation values a number of pixels that exceed a given brightness value within the evaluation region.

8. The imaging apparatus of claim 7, wherein:
the processor carries out the determination for saturated state by comparing brightness values representing maximum brightness within the evaluation region with a given brightness.

9. The imaging apparatus of claim 7, wherein:
the processor carries out the determination for saturated state based on a number of pixels that exceed a given brightness value within the evaluation region.

10. A focus adjustment method, for an imaging apparatus that, in order to focus on a single or a plurality of point light sources, acquires a plurality of image data while moving a focus lens in an optical axis direction, and carries out focus adjustment based on the image data, comprising:
detecting brightness values of pixels within a given evaluation region based on the image data,
calculating high brightness evaluation values based on the brightness values,
calculating symmetry of the high brightness evaluation values in accordance with movement of the focus lens, and
carrying out focus adjustment based on an extreme values calculated based on symmetry.

11. The focus adjustment method of claim 10, wherein;
the high brightness evaluation values are brightness values representing maximum brightness within the evaluation region.

12. The focus adjustment method of claim 10, wherein;
the high brightness evaluation values are a number of pixels that exceed a given brightness value within the evaluation region.

13. The focus adjustment method of claim 10, wherein;
the high brightness evaluation values are sum values of brightness values of pixels that exceed a given brightness value within the evaluation region.

14. The focus adjustment method of claim 13, wherein
the high brightness evaluation values are values resulting from dividing the sum value by a number of pixels that exceed the given brightness value.

15. The focus adjustment method of claim 10, wherein:
a movement range of the focus lens in which a plurality of image data are acquired is set based on a ratio of maximum value to minimum value of a plurality of the high brightness evaluation values within the evaluation region and/or based on a ratio of maximum value to minimum value of symmetry of the high brightness evaluation values, and movement of the focus lens and acquisition of image data are controlled based on the movement range that has been set.

16. The focus adjustment method of claim 10, wherein:
saturated state is determined based on the brightness values, and if the result of this determination of saturated state is that a non-saturated state has been determined, the high brightness evaluation values are made brightness values representing maximum brightness within the evaluation region, and if a saturated state is determined the high brightness evaluation values are made a number of pixels that exceed a given brightness value within the evaluation region.

17. The focus adjustment method of claim 16, wherein:
the determination for saturated state is carried out by comparing brightness values representing maximum brightness within the evaluation region with a given brightness.

18. The focus adjustment method of claim 16, wherein:
the determination for saturated state is carried out based on a number of pixels that exceed a given brightness value within the evaluation region.

19. A non-transitory computer-readable medium storing a processor executable code, which when executed by at least one processor, performs a focus adjustment method,
the processor, in order to focus on a single or a plurality of point light sources, acquiring a plurality of image data while moving a focus lens in an optical axis direction, and carrying out focus adjustment based on the image data,
the focus adjustment method comprising:
detecting brightness values of pixels within a given evaluation region based on the image data,
calculating high brightness evaluation values based on the brightness values,
calculating symmetry of the high brightness evaluation values in accordance with movement of the focus lens, and
carrying out focus adjustment based on an extreme values calculated based on symmetry.

\* \* \* \* \*